US012675686B1

(12) United States Patent
Roostaeyan et al.

(10) Patent No.: US 12,675,686 B1
(45) Date of Patent: Jul. 7, 2026

(54) UPDATING MACHINE LEARNING MODELS ACROSS DEVICES

(71) Applicant: Amazon Technologies, Inc., Seattle, WA (US)

(72) Inventors: Gazelle Tanya Roostaeyan, Saratoga, CA (US); Peyman Passban, Vaughan (CA); Ankit Chadha, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1272 days.

(21) Appl. No.: 17/490,027

(22) Filed: Sep. 30, 2021

(51) Int. Cl.
*G06N 3/045* (2023.01)
*G06F 18/21* (2023.01)
*G06N 3/08* (2023.01)

(52) U.S. Cl.
CPC ............. *G06N 3/08* (2013.01); *G06F 18/217* (2023.01); *G06N 3/045* (2023.01)

(58) Field of Classification Search
CPC ........... G06N 3/08; G06N 3/045; G06F 18/21
See application file for complete search history.

(56) References Cited

U.S. PATENT DOCUMENTS

| | | | | |
|---|---|---|---|---|
| 10,152,676 B1 * | 12/2018 | Strom | ..................... | G06N 3/084 |
| 2015/0127337 A1 * | 5/2015 | Heigold | ................ | G10L 15/063 |
| | | | | 704/232 |

| | | | | |
|---|---|---|---|---|
| 2018/0293517 A1 * | 10/2018 | Browne | .................. | G06F 8/437 |
| 2019/0042878 A1 * | 2/2019 | Sheller | ................ | G06F 21/6245 |
| 2019/0258924 A1 * | 8/2019 | Hamidouche | ........... | G06N 3/08 |
| 2020/0104705 A1 * | 4/2020 | Bhowmick | ............ | G06N 3/044 |
| 2021/0065000 A1 * | 3/2021 | Song | ................... | H04L 67/1004 |
| 2021/0133580 A1 * | 5/2021 | Mehl | ........................ | G06N 5/01 |
| 2021/0168195 A1 * | 6/2021 | O | ........................... | H04L 67/10 |
| 2021/0192357 A1 * | 6/2021 | Sinha | .................... | G06N 3/094 |
| 2021/0312328 A1 * | 10/2021 | Danjo | .................... | G06N 20/00 |
| 2022/0012309 A1 * | 1/2022 | Shachar | ................ | G06N 3/084 |
| 2022/0138564 A1 * | 5/2022 | Da Costa | ............ | G06N 3/0455 |
| | | | | 706/25 |

* cited by examiner

*Primary Examiner* — Phenuel S Salomon

(74) *Attorney, Agent, or Firm* — Pierce Atwood LLP

(57) ABSTRACT

A system may share updates to a machine learning model between a first device and a second device. The first device may determine one or more updatable layers of the model. The first device may train the first model to update parameters of the updatable layers in response to processing input data using the model. The first device may keep parameters of model layers other than the updatable layers constant during the training. The first device may send, to the second device, first model update data representing the updated parameters. The second device may aggregate model update data (e.g., from multiple devices), determine second model update data, and send the second model update data to the first device. The first device may update its model based on the second model update data.

22 Claims, 16 Drawing Sheets

300

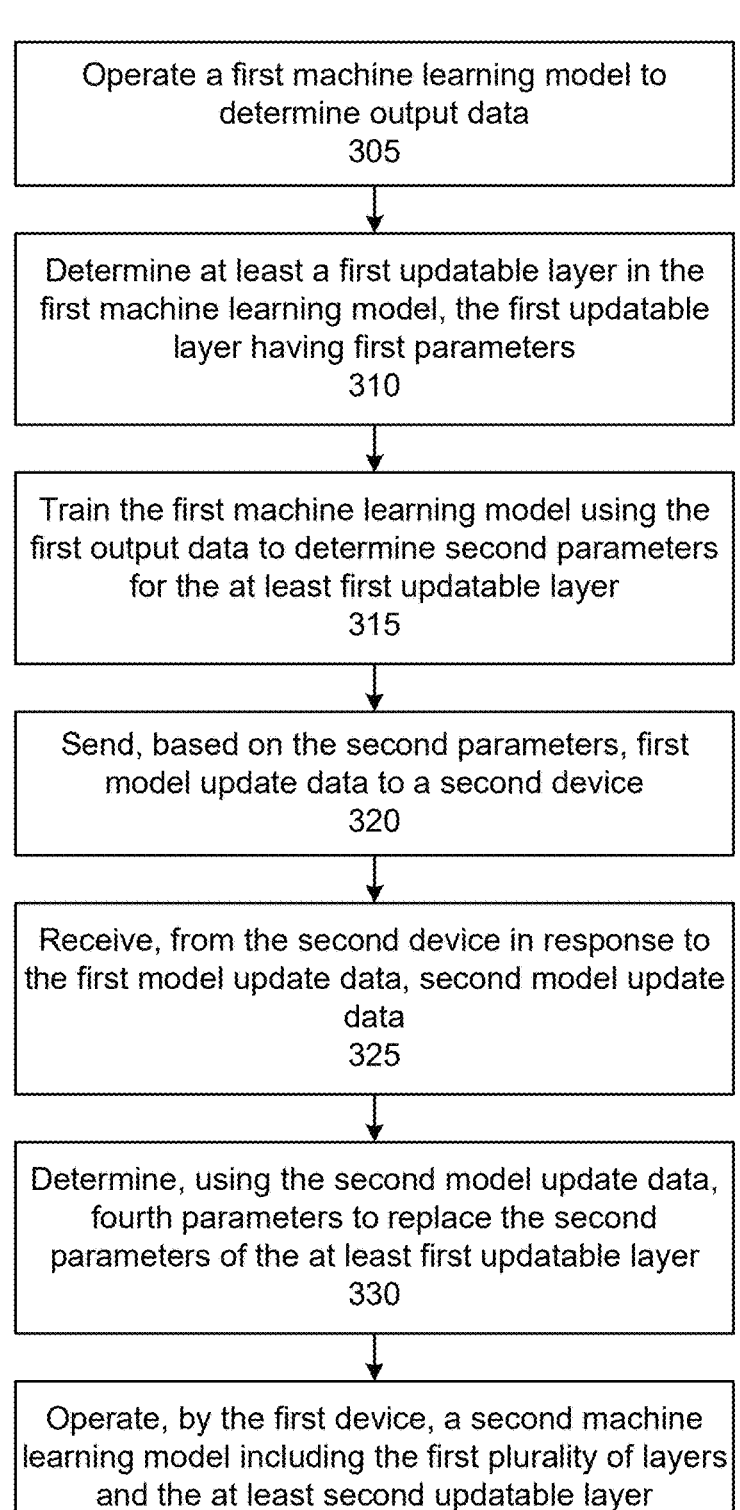

Operate a first machine learning model to
determine output data
305

Determine at least a first updatable layer in the
first machine learning model, the first updatable
layer having first parameters
310

Train the first machine learning model using the
first output data to determine second parameters
for the at least first updatable layer
315

Send, based on the second parameters, first
model update data to a second device
320

Receive, from the second device in response to
the first model update data, second model update
data
325

Determine, using the second model update data,
fourth parameters to replace the second
parameters of the at least first updatable layer
330

Operate, by the first device, a second machine
learning model including the first plurality of layers
and the at least second updatable layer
335

FIG. 3A

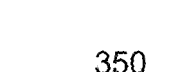

350

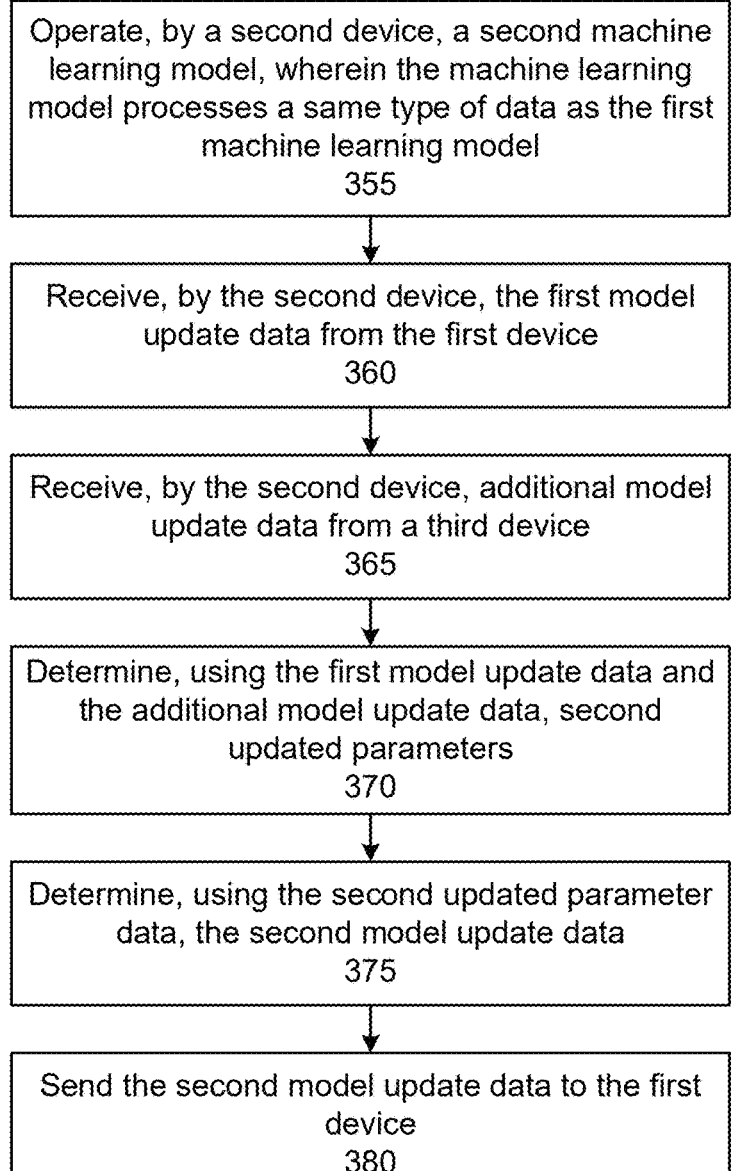

Operate, by a second device, a second machine learning model, wherein the machine learning model processes a same type of data as the first machine learning model
355

Receive, by the second device, the first model update data from the first device
360

Receive, by the second device, additional model update data from a third device
365

Determine, using the first model update data and the additional model update data, second updated parameters
370

Determine, using the second updated parameter data, the second model update data
375

Send the second model update data to the first device
380

Figure 8:
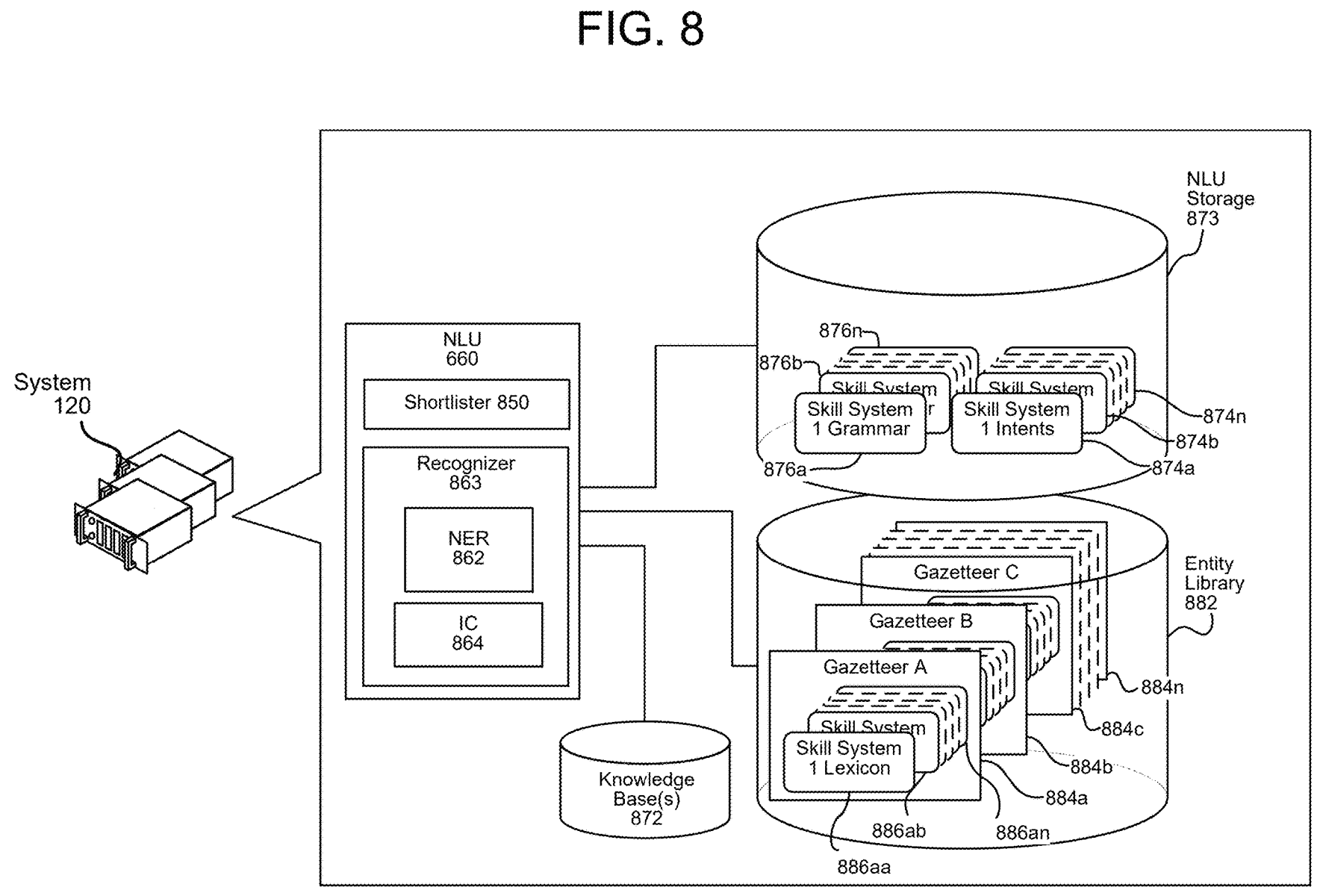

NLU Storage 873

Skill System 874n
Skill System 874b
Skill System 1 Intents 874a

Skill System 876n
Skill System r 876b
Skill System 1 Grammar 876a

Entity Library 882

884n
Gazetteer C 884c
Gazetteer B 884b
Gazetteer A 884a

886an
Skill System 886ab
Skill System 1 Lexicon 886aa

Knowledge Base(s) 872

NLU 660

Shortlister 850

Recognizer 863

NER 862

IC 864

System 120

System(s) 120/125

Bus 1224

I/O Device Interfaces 1202

Controller(s) / Processor(s) 1204

Memory 1206

Storage 1208

Network(s) 199

UPDATING MACHINE LEARNING MODELS ACROSS DEVICES

BACKGROUND

Computer systems may employ machine learning algorithms to perform tasks that may involve recognizing patterns and/or sequences in data and making inferences and/or predictions. Examples of machine learning algorithms include linear regression, logistic regression, artificial neural networks, decision tress, naïve Bayes, random forest, and others. Machine learning algorithms may process training data to build a model. A machine learning model may have many parameters (e.g., corresponding to cells of the model or individual weights) trained using various techniques such as supervised learning, unsupervised learning, and/or reinforcement learning. Machine learning models have many applications including but not limited to: computer vision, fingerprint/facial recognition, object recognition, acoustic event detection, simultaneous localization and mapping, automatic speech recognition (ASR), natural language understanding (NLU), natural language generation (NLG), text-to-speech (TTS), and others.

BRIEF DESCRIPTION OF DRAWINGS

For a more complete understanding of the present disclosure, reference is now made to the following description taken in conjunction with the accompanying drawings.

FIG. 3A is a flowchart describing example operations of a method of a first device sending and receiving updates for a machine learning model using updatable layers, according to embodiments of the present disclosure.

FIG. 3B is a flowchart describing example operations of a method of a second device receiving updatable layer data from a first device and sending model update data back to the first device.

FIG. 8 is a conceptual diagram of how natural language processing is performed, according to embodiments of the present disclosure.

FIG. 9 is a conceptual diagram of text-to-speech components according to embodiments of the present disclosure.

FIG. 12 is a block diagram conceptually illustrating example components of a system, according to embodiments of the present disclosure.

DETAILED DESCRIPTION

Figure 1:
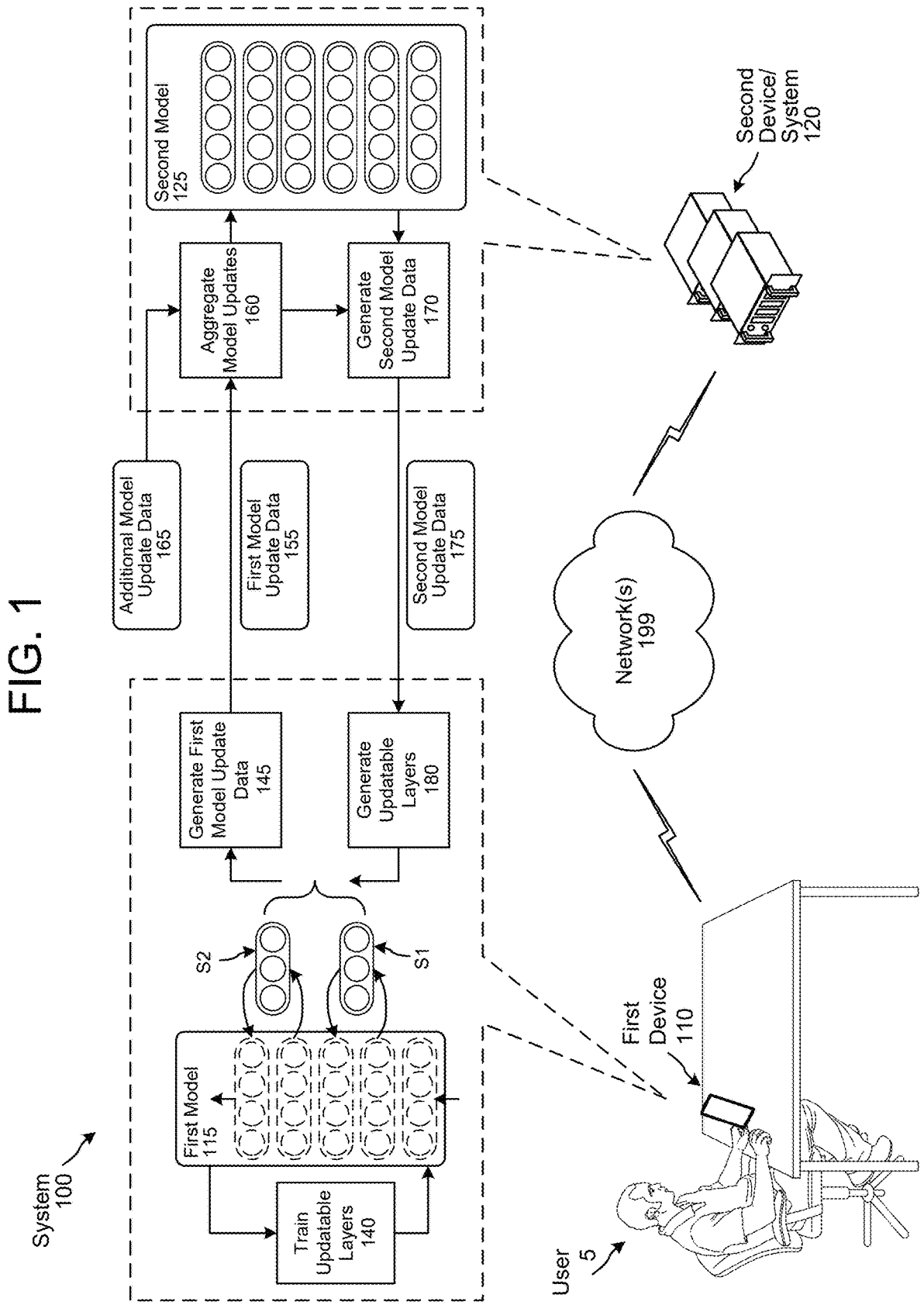
FIG. 1 is a conceptual diagram illustrating example operations of a system performing updates of machine learning models using updatable layers, according to embodiments of the present disclosure.

A computer system may use one or more machine learning models to process input data to make inferences and/or predictions. Such machine learning models may include artificial neural networks (NN) such as convolutional networks, recurrent neural networks, long short-term memory (LSTM), graph neural nets, feed-forward models, transformers, conformers, etc. A NN may be made up of one or more layers, with a layer including one or more cells (also referred to as artificial neurons). A cell may include a number of inputs and outputs. A cell may receive inputs and generate output(s) by performing one or more mathematical and/or logical operations described by one or more parameters of the cell. For example, a cell may take a weighted sum of input values and apply an activation function on the result to yield the output(s). Some cells may additionally perform operations based on a previous output, a memory state, a context signal, etc. A computer system may train a NN by various techniques to improve results of the NN with respect to a dataset by adjusting some or all of the parameters.

From time to time, NN model parameters may be updated based on a new dataset or some other improvement. In some cases, a first device operating the model may share or otherwise contribute to the generation of model update data for a second device operating the same or otherwise similar model. However, some updates may be based on user data or other confidential information, which the system may prevent from leaving the first device for improving the second device. To keep the data confidential or otherwise secret, the first device may share information limited to model parameters derived from the data in from which the data cannot be reconstructed. Because NN models can get large, transferring all model parameters between the devices may consume much bandwidth.

Offered are a system, method, and other technology for improving updates to NN models between devices. A NN model may be configured with one or more updatable layers. An updatable layer may be neural network model that may be inserted between existing layers of a NN model (e.g., between encoder and/or decoder layers of a transformer or an RNN-T, between layers of a convolutional neural network, between LSTM cells, etc.). A updatable layer does not need to share the architecture of the model or model layers into which it is inserted; for example, a convolutional layer could be added to an LSTM, a transformer layer could be added to an RNN-T, a GRU layer could be added to a conformer, etc., and vice-versa. In some cases, an updatable layer can be selected from existing layers of a pre-trained model. In such cases, other layers are frozen during training, and only the selected layers are trained.

When training the model using the new dataset, layers of the model other than the updatable layers may be frozen (e.g., have their parameters kept constant) while only parameters of the updatable layer(s) is/are updated. The first device may send the parameters of the updatable layer(s) (e.g., and not the frozen layers) to a second device. Because the first device does not send all parameters of the model, the model update data may be much smaller relative to the size of the complete model, and considerable bandwidth may be conserved. Moreover, retraining only the updatable layer(s) (e.g., adjusting updatable layer parameters while holding other parameters constant) reduces the computational cost of training relative to training all layers of the model.

Using updatable layers may improve over other techniques that involve inserting trainable objects into NN layers. Updatable layers may perform well when used to update a model using federated knowledge, and may still be effective when inserted randomly into a model (e.g., without detailed knowledge of the target model architecture). The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 6:
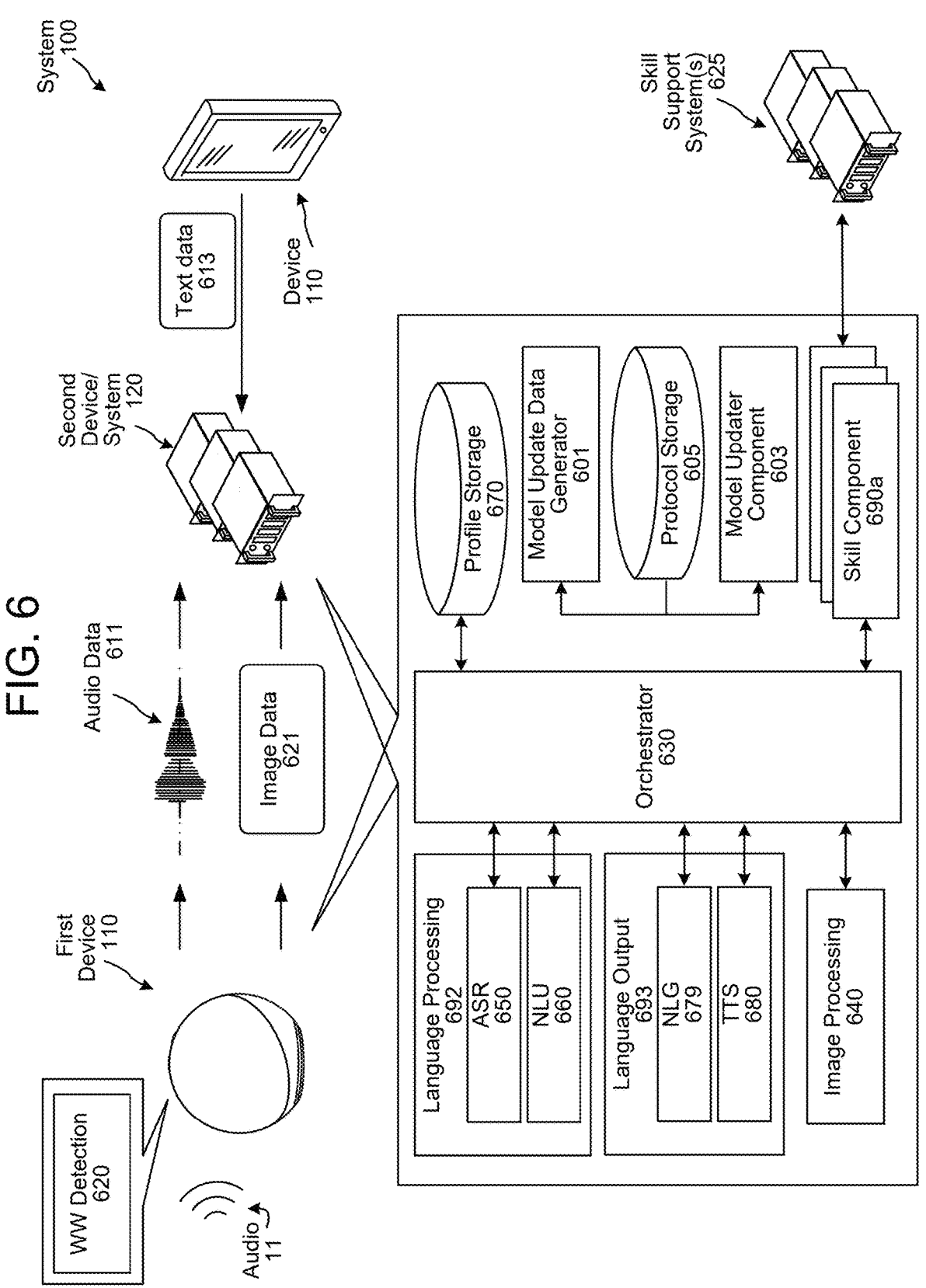
FIG. 6 is a conceptual diagram of components of the system, according to embodiments of the present disclosure.

FIG. 1 is a conceptual diagram illustrating example operations of a system 100 performing updates of machine learning models using updatable layers, according to embodiments of the present disclosure. The system 100 may employ one or more machine learning models to perform various functions including, but not limited to, audio processing such as acoustic event detection, ASR, speaker recognition, NLU, TTS, etc.; image processing such as text recognition, object detection, facial recognition, etc.; and/or other types of processing based on, for example, sensor data, radar/LIDAR/sonar data, financial data, medical data, etc. An example system 100 performing various processing operations using machine learning models is shown in FIG. 6 and described below.

Figure 4:
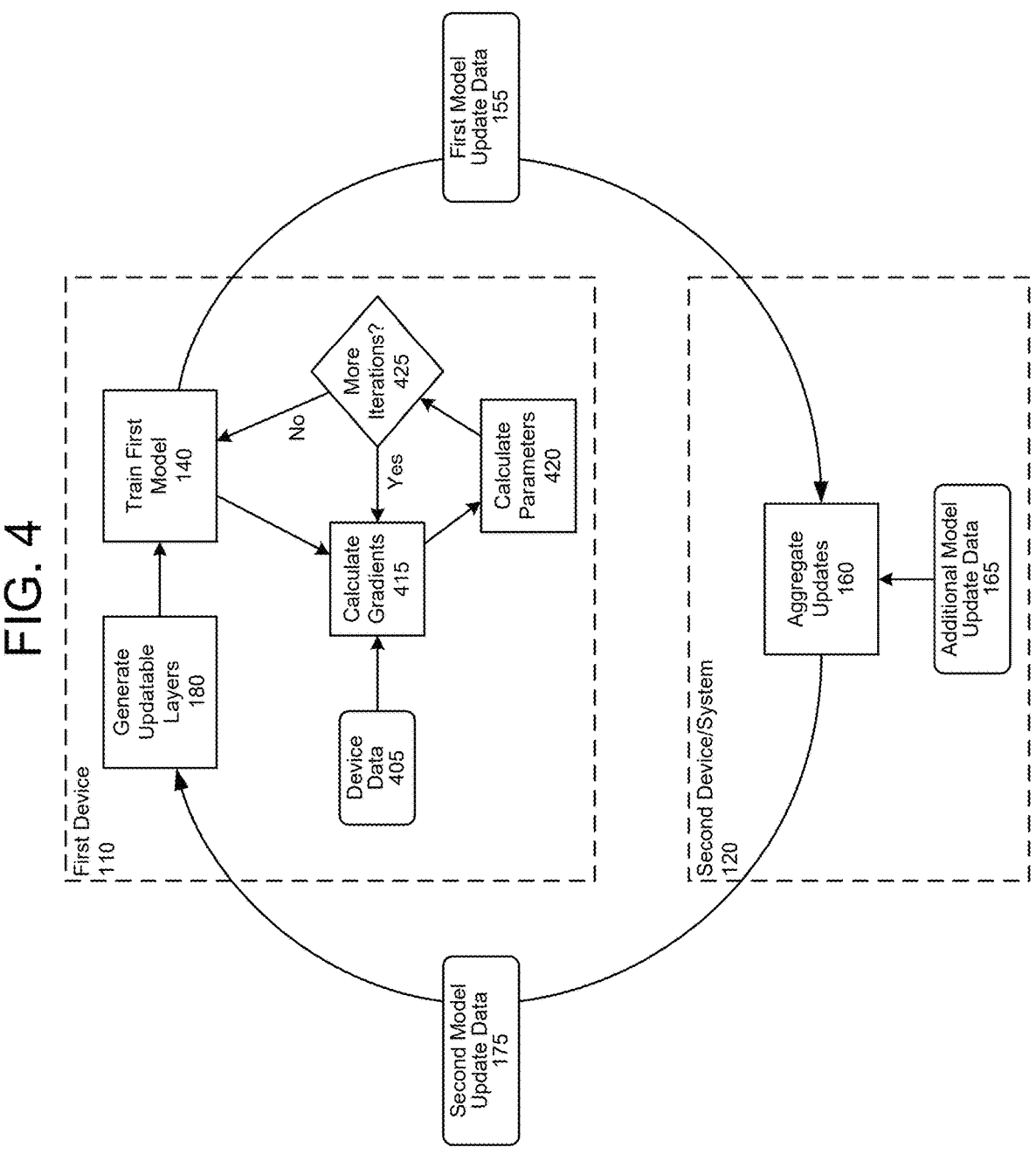
FIG. 4 is a conceptual diagram illustrating example operations of a device training and updating a machine learning model, according to embodiments of the present disclosure.

The system 100 shown in FIG. 1 includes a first device 110 and a second device or system 120 communicating via one or more computer networks such as the network 199. In some implementations, the first device 110 and second device 120 may both be user devices. In some implementations, the first device 110 may be a user device and the second device 120 may be a server system. The system 100 may include additional devices 110 and systems 120, examples of which are illustrated in and described with reference to FIGS. 11 through 13. The device 110 may store and operate one or more client machine learning models, such as the first model 115. The first model 115 may be, for example and without limitation, an ASR model such as described below with reference to FIG. 7, an NLU model such as described below with reference to FIG. 8, a TTS model such as described below with reference to FIG. 9, an image processing model such as described below with reference to FIG. 10, etc. A user 5 may operate the device 110 to perform operations using one or more first models 115 to, for example, process spoken commands or process image data received by a camera of the device 110. During operation, the device 110 may receive input data (e.g., from the user via a microphone, camera, and/or touchscreen) and process it using the first model 115 to determine output data. The first device 110 may train 140 the one or more updatable layers (e.g., S1 and S2) of the first model 115 based on, for example, results of the processing to improve performance of the first model 115. Training of the first machine learning model 115 by the first device 110 is illustrated in FIG. 4 and described in further detail below.

The first device 110 may update the first model 115 based on outcomes of processing. To reduce a computational cost of the training and/or to reduce a bandwidth needed for transferring model update data, the device 110 may train 140 the first model 115 by freezing some layers of the model and only updating certain others, referred to as "updatable layers." In the example shown in FIG. 1, the first device 110 may update the updatable layers S1 and S2 during the training process 140, while holding parameters of the other layers (indicated by dashed lines) constant. In some implementations, the updatable layers S1 and S2 may be additional layers inserted between existing layers of the first model 115 (e.g., as described further with reference to FIG. 2A). The updatable layers S1 and S2 may be of the same architecture as the first model 115 (or one or more layers of the first model 115) or may be a different architecture. In some implementations, the updatable layers S1 and S2 may be existing layers of the first model 115 (e.g., as described further with reference to FIGS. 2B). In various implementations, the first device 110 may update a single updatable layer or multiple updatable layers.

Occasionally, the first device 110 may send model update data to the second device or system 120. The first device 110 may generate 145 the model update data based on the updated parameters of the updatable layers S1 and S2. In some implementations, the first device 110 may transform the updatable layer parameters to obscure model information from would-be interceptors. The device 110 may send the resulting first model update data 155 to the second device 120.

In some implementations, the first device 110 may perform some transformation on the updatable layer parameter data to obscure information about the first model 115 from a would-be interceptor of the first model update data 155. For example, the first device 110 may change the order of updatable layers as represented in the first model update data 155 or perform other operations to obscure correspondence between parameter values and a structure of the first model 115. The device 110 may project updatable layer parameter values to change a number of parameters, dimensions of the parameters and/or layers, and or change parameter values. The first device 110 and second device 120 may agree on one or more protocols. The protocols may describe the updatable layers as well as operations for transforming the updatable layer parameter data to generate the first model update data 155 (and/or the second model update data 175). The first device 110 and/or the second device 120 may include an indication of the particular protocol used to transform the updatable layer parameter data such that the receiving device/system can retrieve the protocol and use operations described therein to decode the model update data. The first device 110 and/or second device 120 may change the protocol used from time to time; for example, with every update, after a certain number of updates, on a pre-determined schedule, and/or based on other agreed—to patterns, etc. A protocol may additionally or alternatively describe operations for encryption and/or compression of the updatable layer parameter data. These operations are provided as examples, and maybe used in combination with each other and/or with additional features described herein.

The second device 120 may receive the first model update data 155 and process it to generate 170 second model update data 175, which may be returned to the first device 110 and/or one or more other devices 110. The second device 120 may receive additional model update data 165 from one or more other devices 110. In some implementations, the second device 120 may determine a protocol used to generate the model update data, and use the protocol to decode the model update data to determine parameter data for the updatable layers. The second device 120 may aggregate 160 the model update data from the first device 110 and/or the one or more other devices 110. In some implementations, the second device 120 may generate 170 the second model update data 175 directly from the aggregated model updates; that is, without updating a model. The second device 120 may combine the model update data using various mathematical functions such as averaging, weighted averaging, etc. In some implementations, the second device 120 may update the second model 125 based on the aggregated model updates. In some implementations, the second device 120 may generate 170 the second model update data 175 based on the second model 125. The second device 120 may update the second model 125 using the model update data 155 and/or 165 by applying various mathematical function. For example, and without limitation, the second device 120 may apply a mathematical function that shows divergence or distance between respective outputs of an updatable layer from the first model 115 and a corresponding layer (or layers) of the second model 125. In some implementations, the second device 120 may use mean square error, Kullback-Leibler (KL) divergence, etc. The second device 120 may determine a loss using one or more of these methods, it may adjust parameters of the second model 125 to reduce the loss. In some implementations, the second device 120 may perform knowledge distillation to train the second model 125 based on the first model update data 155. The second device 120 may use the first model update data 155 to train one or more layers of the second model 125 based on the parameters of the updatable layers S1 and S2. In some implementations, the second device 120 may train internal (e.g., hidden) layers of the second model 125 based on the first model update data 155. These and other operations of the second device 120 are described in additional detail below with reference to FIGS. 4 and 5.

When the second model 125 has been updated based on the first model update data 155 and/or additional model update data 165, the second model 125 may be used to update new updatable layers for sending back to the first device 110 and/or other devices in the form of the second model update data 175. The first device 110 may generate 180 new updatable layers for the first model 115 based on the second model update data 175. In some implementations, the first device 110 may validate the second model update data 175. For example, the first device 110 may determine an updated first model 115 (e.g., with the updatable layer parameters updated to values indicated by the second model update data 175). The first device 110 may then test the resulting updated first model 115 using an evaluation dataset to generate output data. The device 110 may compare the output of the previous first model and the updated first model. Based on the comparison, the first device 110 may determine whether or not to proceed with the updated first model or revert to the previous first model. In other cases, the first device 110 may perform a weighted update of the first model 115 by performing a weighted averaging of the previous updatable layer parameter values and the updated updatable layer parameter values represented in the second model update data 175 (e.g., to favor either the previous or updated values).

Following the update of the first model 115 based on the second model update data 175 received from the second device 120, the process may repeat with the device 110 continuing to train 140 the now updated first model 115 based on input data processed by the device 110.

Figure 2A:
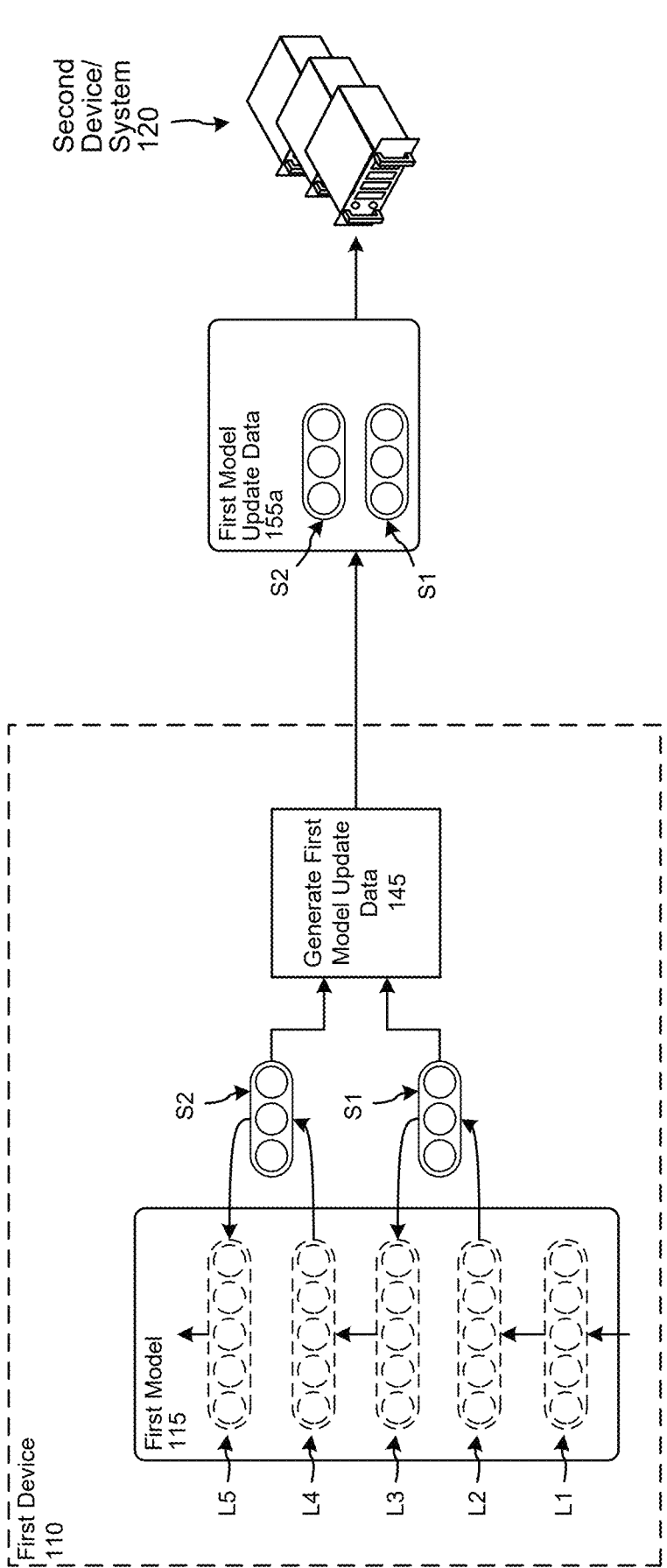
FIGS. 2A and 2B are conceptual diagrams illustrating various examples of sending and receiving machine learning model updates using updatable layers, according to embodiments of the present disclosure.
Figure 2B:
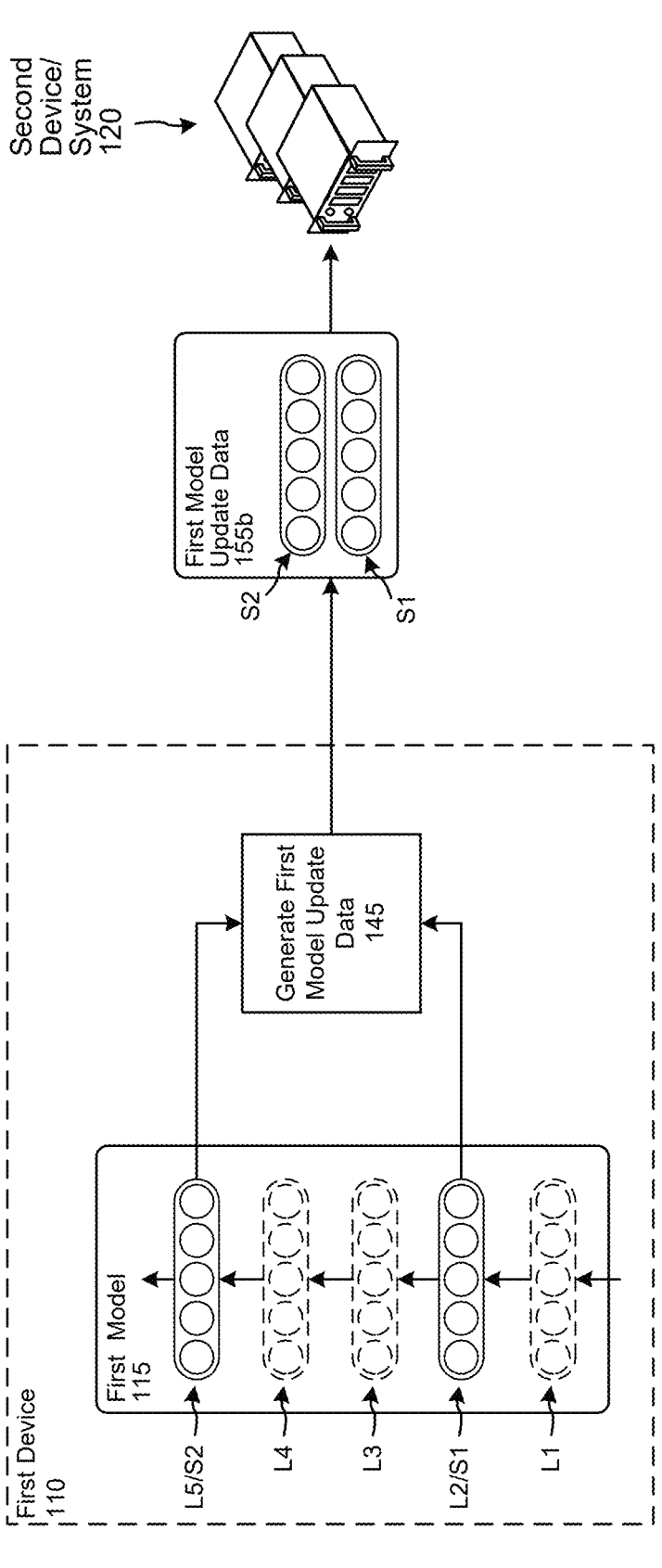

FIGS. 2A and 2B are conceptual diagrams illustrating various examples of sending and receiving machine learning model updates using updatable layers, according to embodiments of the present disclosure. In each example, training and sharing updatable layer data rather than all parameters of the first model 115 may conserve computational resources of the first device 110 and/or bandwidth of the network connection between the first device 110 and second device 120. In addition, the devices may transform the parameter data to obscure the architecture and/or make up of the first model 115 in the event that a third part intercepts the first model update data 155 (and/or the second model update data 175). A protocol may be shared between the device 110 and the system 120 such that the system 120 may be able to decode model update data received from the device 110, and vice versa. In some implementations, the device 110 and/or the system 120 may have a protocol storage (such as the protocol storage component 605 described below). In some implementations, the device 110 and/or the system 120 may send an indication of a particular protocol used to generate model update data to the recipient system/device. The recipient may then retrieve the indicated protocol for decoding the model update data. In some implementations, the device 110 and/or system 120 may change the protocol occasionally; for example, for each model update or after a certain number of model updates. In various implementations, the device 110 may use the same or different protocol(s) to receive and/or decode model update data, and generate 180 new updatable layers for the first model 115.

FIG. 2A illustrates a first example use of updatable layers in a first model 115 in which the updatable layers S1 and S2 are inserted in between existing layers of the first model 115. The first model 115 may be on trained, for example, using samples in an initial dataset. The first model 115 may or may not be updated based on additional samples. One or more updatable layers may be inserted between adjacent existing layers of the first model 115 such that internal information passing between two adjacent layers is routed through, and modified by, the updatable layer. In this example, the first model 115 may include a plurality of layers L1-L5, and the updatable layer S1 may be inserted between layers L2 and L3, and the updatable layer S2 may be inserted between the layers L4 and L5. More or fewer updatable layers may be inserted into the first model 115, and the locations of the updatable layers may vary relative to the existing layers L1-L5 of the first model 115. In some implementations, the updatable layers may be of a different architecture and/or NN type than the first model 115 (e.g., convolutional layers inserted into an RNN, etc.). During training, the first device 110 may keep the parameters of the existing layers L1-L5 constant and only update the parameters of the updatable layers S1 and S2 (and/or any other updatable layers that have been inserted into the first model 115). The first device 110 may update the updatable layer parameters using, for example, a gradient descent algorithm.

FIG. 2B illustrates a second example use of updatable layers in a first model 115 in which the updatable layers S1 and S2 are selected from existing layers of the first model 115. As in FIG. 2A, the first model 115 may be on trained, for example, using samples in an initial dataset. The first model 115 may or may not be updated based on additional samples. The first device 110 may select one or more existing layers L1-L5 of the first model 115 for use as an updatable layer. In this example, the first device 110 selects existing layer L2 as the first updatable layer S1, and existing layer L5 as the second updatable layer S2. In various implementations, the first model 115 may have more or fewer layers, and the first device 110 may select more or fewer updatable layers at various positions. During training, the first device 110 may keep the parameters of layers other than the updatable layers constant, and only update the parameters of the updatable layers S1 and S2 (and/or any other updatable layers that have been selected from the first model 115). Thus, in the example shown in FIG. 2B, the first device 110 may keep the parameter values of the layers L1, L3, and L4 constant, and update the parameter values of the layers L2/S1 and L5/S2. The first device 110 may update the updatable layer parameters using, for example, a gradient descent algorithm.

In the examples shown in FIGS. 2A and 2B, the first device 110 may determine to send model update data to the second device 120 after a certain number of training epochs. The first device 110 may generate 145 first model update data 155a and/or 155b based on the now-updated parameters of the updatable layers S1 and S2. In some implementations, the first device 110 may perform one or more mathematical operations to transform the parameter data. For example, the first device 110 may change the order of updatable layers as represented in the first model update data 155, change the number and/or dimensions of layers, modify parameter values, and/or or perform other operations to obscure correspondence between parameter values and a structure of the first model 115. A protocol shared between the first device 110 and the second device 120 may describe the operations and/or inverse operations for restoring the updatable layer parameter data from the model update data. The first device 110 may send an indication of the protocol used to transform the parameter data to the second device 120 to allow the second device 120 to decode the model update data and restore the updatable layer parameter data.

The operations shown in FIGS. 2A and 2B are provided as examples of manners in which updatable layers may be inserted between, or selected from, existing layers of a machine learning model. In some implementations, a first updatable layer may be inserted into a model and a second updatable layer may be selected from the existing layers of the model. In various implementations, more or fewer updatable layers may be used, and their locations may be varied. Location of the updatable layers may be determined empirically based on performance, placed according to predetermined rules, and/or placed randomly. In the example operations shown in FIGS. 2A and 2B, the second device 120 may receive the first model update data 155, and determine the parameter values from the first model 115. The second device 120 may aggregate model update data from other devices and generate second model update data 175 and/or update its own second model (e.g., the second model 125). Examples of receiving, aggregating, and pushing model update data are described further below with reference to FIGS. 4 and 5.

FIG. 3A is a flowchart describing example operations of a method 300 of a first device sending and receiving updates for a machine learning model using updatable layers, according to embodiments of the present disclosure. The method 300 may be performed by one or more devices 110 in communication with a system 120.

The method 300 may include operating (305) a first machine learning model to determine output data. The first device 110 may operate the machine learning model to, for example, recognize speech in audio data, objects and/or faces in image data, etc. The output data generated by the machine learning model may include labels, predictions, inferences, etc.

The method 300 may include determining (310) at least a first updatable layer in the first machine learning model. In some implementations, the first device 110 may insert one or more new, updatable layers in to the first machine learning model. In some implementations, the first device 110 may select one or more existing layers of the first machine learning model to serve as the updatable layer(s). The updatable layer(s) may have first parameters (e.g., specifying weights, activation functions, etc. of cells of the updatable layer(s)).

The method 300 may include training (315) the first machine learning model using the first output data to determine second parameters for the at least first updatable layer. The first device 110 may train the first machine learning model using, for example, a gradient descent algorithm, to improve performance of the model with respect to input data processed by the model.

The method may include sending (320) based on the second parameters, first model update data to the second device 120. From time to time (e.g., on demand, after a predetermined number of training epochs, at predetermined times, etc.) the device 110 may determine to send model update data to the second device 120. In some implementations, the first device 110 may determine a protocol for sending first model update data to the second device 120. The protocol may specify one or more operations for transforming the parameter data. In some implementations, the first device 110 may send an indication of the protocol in, or accompanying, the model update data.

The method 300 may include receiving (325), from the second device in response to the first model update data, second model update data. In some implementations, the second model update data may include or be accompanied by an indication of protocol, which the first device 110 may use to reconstruct updatable layer parameter values from the second model update data. The method 300 may include determining (330), using the second model update data, fourth parameters to replace the second parameters of the updatable layers. The first device 110 may update the first machine learning model with the new updatable layers having the fourth parameters to generate a second machine learning model. The second machine learning model may include the new updatable layers. The method 300 may include operating (335), by the first device, the second machine learning model.

In some implementations, the device 110 may validate the second model update data. For example, the device 110 may determine a dataset of samples (e.g., stored and/or simulated) of data of the type the machine learning model processes (e.g., audio data, images, sensor data, etc.). The device 110 may process the dataset using the first machine learning model and the second machine learning model. The device 110 may determine respective error rates of the output of each model. The device 110 may determine, based on the error rates, whether to process subsequent input data using the second machine learning model (e.g., if the update results in improved performance of the model such as a lower error rate) or to reject the model update and continue processing subsequent input data using the first machine learning model.

In some implementations, the device 110 may perform a partial update; for example, by determining parameters for the second machine learning model by applying a weight factor to the previous updatable layer parameter values and to the parameter values represented in the second model update data.

The device 110 may repeat various stages of the method 300 to perform additional model updates based on subsequently processed input data and/or model update data received from the system 120.

FIG. 3B is a flowchart describing example operations of a method 350 of a second device receiving updatable layer data from a first device 110 and sending model update data back to the first device 110. The method 350 may be performed in conjunction with the method 300. The method 350 may be performed by the second device 120 based on receiving model update data from a first device 110 (and, in some implementations, additional devices).

The method 350 may include operating (355), by the second device, a second machine learning model, wherein the second machine learning model processes a same type of data as the first machine learning model. The second device may be a user device similar to the first device, or may be a server system maintaining a central machine learning model (e.g., that may receive and aggregate model updates from multiple client devices).

The method 350 may include receiving (360), by the second device, the first model update data from the first device. The method 350 may also include receiving (365), by the second device, additional model update data from a third device (and possibly other devices).

The method 350 may include determining (370), using the first model update data and the additional model update data, second updated parameters. In some implementations, the second device may use the second updated parameters to update one or more internal layers of the second machine learning model.

The method 350 may include determining (375), using the second updated parameter data, the second model update data. In some implementations, the second device may aggregate the first model update data and the additional model update data using one or more mathematical operations to generate the second model update data. In some implementations, the second device may update the second machine learning model using the first model update data and the additional model update data, and then generate the second model update data based on the second machine learning model.

The method 350 may include sending (380) the second model update data to the first device. In some implementations, the second device may send model update data to additional devices as well. The second device 120 may repeat various stages of the method 350 to perform additional model updates based on model update data subsequently received from the first device and/or other devices.

FIG. 4 is a conceptual diagram illustrating example operations of a device training and updating a machine learning model, according to embodiments of the present disclosure. The first device 110 may train the first machine learning model 115 using the process 140, which may include the steps 415 through 425 described below to generate the first model update data 155. The first device 110 may send the first model update data 155 to the second device/system 160, which may aggregate the first model update data 155 with additional model update data 165 received from other devices. The second device/system 120 may send the second model update data 175 (e.g., generated using the aggregated model update data) to the first device 110. The first device 110 may update the first machine learning model 115 by generating new updatable layers using the process 180. The process of sending, receiving, aggregating, and implementing model updates may be repeated.

The training process 140 may involve training the first machine learning model 115 using device data 405. The device data 405 may represent one or more user interactions with the first device 110 and may include input and/or output data processed/generated by the first device 110 using the first machine learning model 115. The device data 405 may include personal data such that that user settings and/or data privacy regulations may prohibit sending the device data 405 to other devices and/or systems. The device data 405 may, however, be used to train the first machine learning model 115 on the first device 110. Based on the training, model update data representing the updated parameters may be sent to the second device/system 120 for updating the second machine learning model 125 and/or aggregating with other model update data.

The training process 140 may include performing gradient descent and/or backpropagation algorithms to update parameters of some or all layers of the first machine learning model 115. For example, when a subset of layers/parameters is trained, the other layers/parameters may be held constant. In various implementations, the training process 140 may include, for example, batch gradient descent, stochastic gradient descent, mini-batch gradient descent, etc., depending on use of the device data 405. In a training iteration, the first device 110 may calculate 415 gradients for the parameters to be trained based on the device data 405 (or a subset of the device data 405). Using the gradients calculated at the step 415 and a predetermined learning rate, the first device 110 may calculate 420 updated parameters for the first machine learning model 115. The training process 140 may include one or more iterations per model update. Thus, the training process 140 may include determining 425 whether to iterate. If so ("yes" at 425), the training process 140 may repeat the steps 415 and 420. If not ("no" at 425), the training process 140 may end for the model update. The first device 110 may generate the first model update data 155 based on the updated parameters, and send the first model update data 155 to the second device/system 120.

Figure 5A:
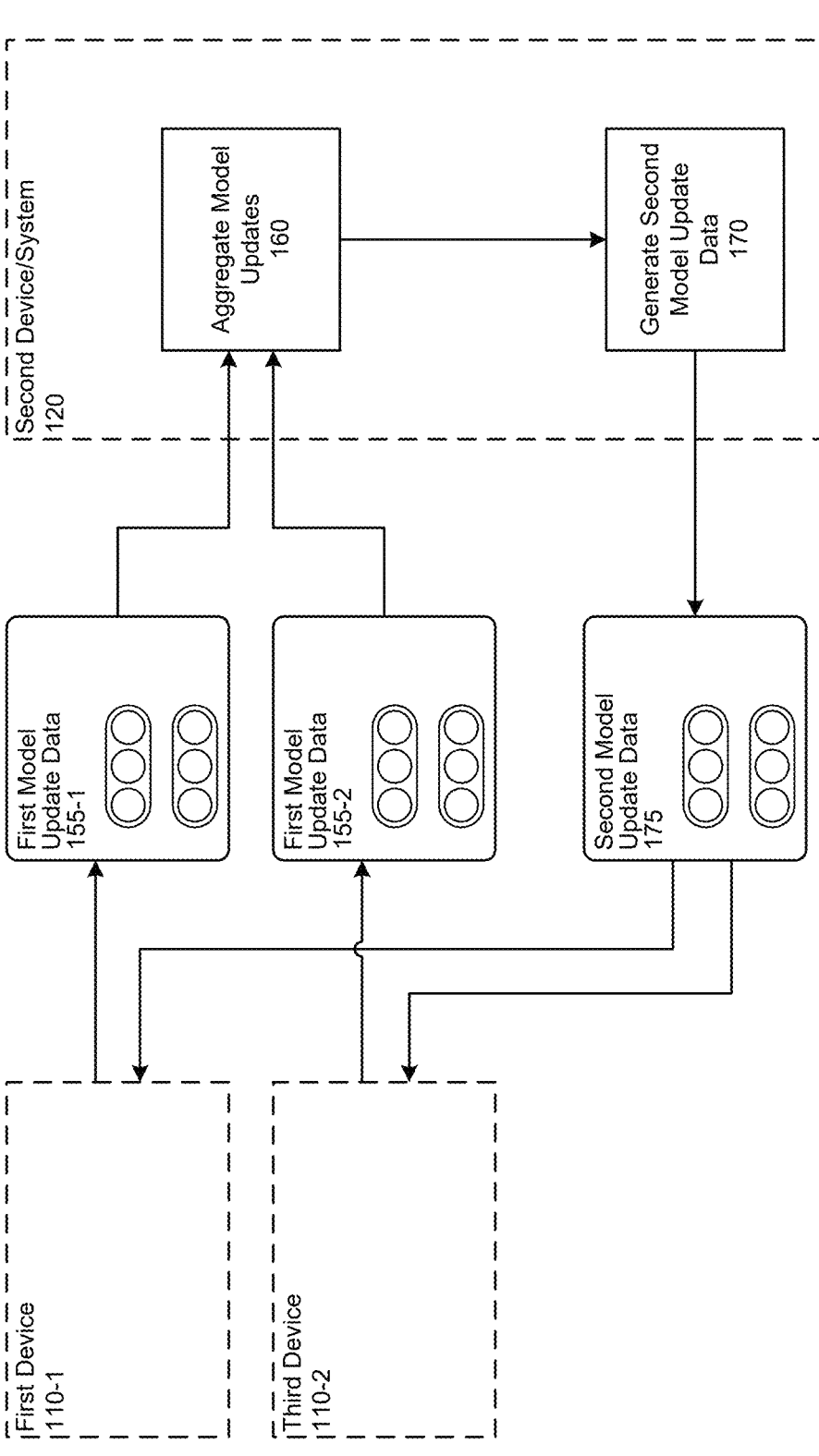
FIG. 5A is a conceptual diagram illustrating an example of aggregating updatable layer model update data and from multiple devices and updating the updatable layers, according to embodiments of the present disclosure.
Figure 5B:
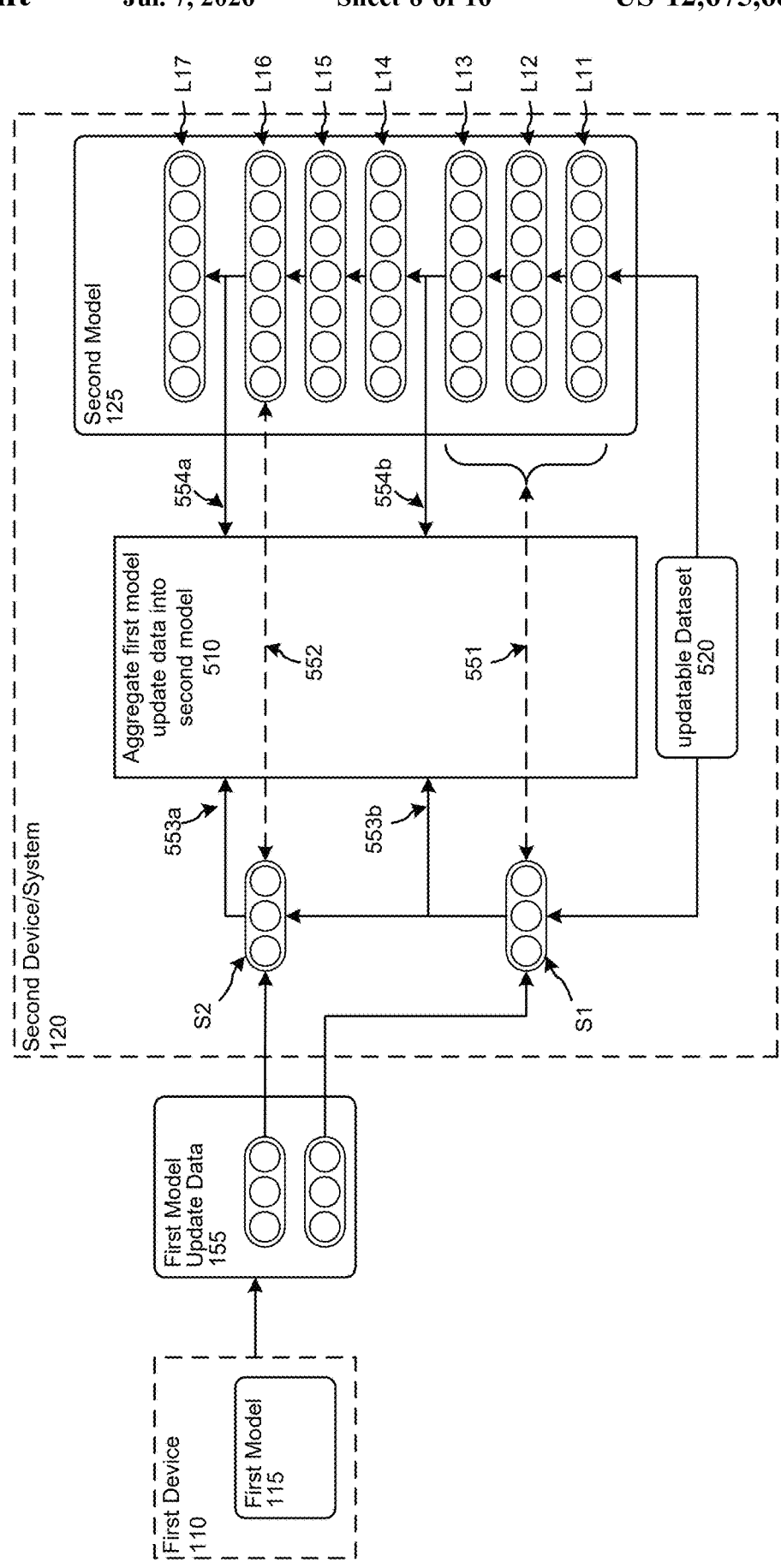
FIG. 5B is a conceptual diagram illustrating an example of using updatable layer data from a first device to update a model on a second device, according to embodiments of the present disclosure.

FIG. 5A is a conceptual diagram illustrating an example of aggregating updatable layer model update data and from multiple devices and updating the updatable layers, according to embodiments of the present disclosure. In the example shown in FIG. 4, a first device 110-1 sends model update data 155-1 to the second device 120. In addition, a third device 110-2 sends additional model update data 155-2 to the second device 120. The devices 110-1 and 110-2 may generate the model update data by one or more of the techniques described previously. The second device 120 may aggregate (160) the model update data using various mathematical operations including, for example, averaging, weighted averaging, and/or by using the model update data to update a second machine learning model maintained by the second device 120 (as shown in FIG. 5B). The second device 120 may use the aggregated model update data to generate (170) the second model update data 175. In some implementations, the second device 120 may determine updated updatable layer parameters for sending back to the device 110-1 and/or 110-2. In some implementations, the second device 120 may perform one or more operations on the updated updatable layer parameters to obscure details of the machine learning models from would-be interceptors. The second device 120 may send the second model update data 175 back to the device 110-1 and/or the device 110-2.

The device 110-1 and/or 110-2 may use the second model update data 175 to update their own machine learning models.

FIG. 5B is a conceptual diagram illustrating an example of using updatable layer data from a first device 110 to update a model on a second device 120, according to embodiments of the present disclosure. The first device 110 may operate a first machine learning model 115, and generate first model update data 155 based on updates to one or more updatable layers of the first machine learning model. The second device 120 may operate a second machine learning model 125, which may process a same type of data as the first machine learning model 115 (e.g., image data, audio data, etc.) and/or make similar inferences (e.g., object recognition, speech recognition, etc.). The first machine learning model 115 and the second machine learning model 125 may, however, have different architectures; for example, each may have a different number and/or type of layers, with layers having different numbers of cells and/or connections per cell, etc. The second device 120 may perform federated learning and/or knowledge distillation techniques to update the second model 125 based on the first model update data 155 (e.g., and without obtaining the data the first device 110 may have used to update the first model 115 to generate the first model update data 155).

In the example shown in FIG. 5B, the first model update data 155 includes a representation of parameters of a first updatable layer S1 and as second updatable layer S2. The second device 120 may aggregate 510 the first model update data 155 into the second machine learning model 125. The second device 120 may use a shared dataset 520 to bring the second model 125 (e.g., one or more layers L11-L17 of the second model 125) into convergence with the updatable layer parameters represented in the updatable layers S1 and S2. The shared dataset 520 may include public data and/or synthesized data that includes samples of example data processed by the machine learning models. The shared dataset 520 may exclude any user data such as input data used by the first device 110 to update the first model 115.

Using the shared dataset 520, the second device 120 can bring the second model 125 into convergence with the updatable layers S1 and S2. In some implementations, the second device 120 can bring one or more individual layers L11-L17 of the second model 125 into convergence with the updatable layers S1 and/or S2. For example, the second device 120 may determine a correspondence 551 between the first updatable layer S1 and layers L11 through L13. The second device 120 may update parameters of the layers L11 through L13 such that the internal information 554b output by the layers L11 through L13 converges with the internal information 553b output by the first updatable layer S1. Similarly, the second device 120 may determine a correspondence 552 between the second updatable layer S2 and the layer L16. The second device 120 may update parameters of the layer L16 such that the internal information 554a output by the layer L16 converges with the internal information 553a output by the second updatable layer S2. In some implementations, the second device 120 may determine additional correspondences for additional updatable layers, and update additional layers of the second model 125. The updated second model 125 may be used to determine update updatable layer parameters for generating the second model update data 175 for sending to the first device 110 and/or other devices.

The processes described with reference to FIGS. 4 and/or 5 may repeat for future updates of the machine learning models based on further processing of input data.

FIG. 6 is a conceptual diagram of components of the system 100, according to embodiments of the present disclosure. The system may include components divided and/or shared between one or more devices 110, a second device or system 120, and/or systems 625. Some components may employ one or more machine learning models that may be updated based on processing input data using a first model, aggregating model update data from one or more devices 110 into a second model, and/or receiving update data from a system operating the second model. Components of the system 100 (e.g., the first device 110 and/or system 120) may include a model update data generator component 601 for generating model update data based on the techniques described herein, a model updater component 603 for updating machine learning models based on received model update data, and a protocol storage component 605 for storing protocols used for generating the model update data based on updated model parameters, and decoding the model update data to determine the updated model parameters. Although FIG. 6 shows audio data 611 and image data 621 sent between the first device 110 and the second device/system 120, in some implementations, user input data such as the audio data 611 and image data 621 is processed on the user device (e.g., the first device 110) with only results data such as ASR data or image recognition data sent to the second device/system 120.

The system 100 may operate using various components as described in FIG. 6. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 620. The wakeword detection component 620 may be configured to detect various wakewords. In at least some examples, each wakeword may correspond to a name of a different digital assistant. An example wakeword/digital assistant name is "Alexa." In another example, input to the system may be in form of text data 613, for example as a result of a user typing an input into a user interface of device 110. Other input forms may include indication that the user has pressed a physical or virtual button on device 110, the user has made a gesture, etc. The device 110 may also capture images using camera(s) 1118 of the device 110. The image data 621 may be used in various manners by different components of the device/system to perform operations such as determining whether a user is directing an utterance to the system, interpreting a user command, responding to a user command, etc.

The wakeword detector 620 of the device 110 may process the audio data, representing the audio 11, to determine whether speech is represented therein. The wakeword detector 620 may process the audio data using one or more models as described below. One or more of these models may be updated using the techniques discussed herein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 620 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 620 and/or input is detected by an input detector, the device 110 may "wake" and begin generating audio data 611, representing the audio 11. The device 110 may process the audio data 611 using one or more machine learning models described below. In some implementations, the first 110 device may send data representing a result of processing the audio data 611 and/or image data 621 to the second device/system(s) 120 for further processing. Audio data 611 sent to the second device/system 120 may include data corresponding to the wakeword; in other embodiments, the portion of the audio corresponding to the wakeword is removed by the device 110 prior to sending the audio data 611 to the system(s) 120. In the case of touch input detection or gesture based input detection, the audio data may not include a wakeword.

In some implementations, the system 100 may include more than one system 120. The systems 120 may respond to different wakewords and/or perform different categories of tasks. Each system 120 may be associated with its own wakeword such that speaking a certain wakeword results in audio data be sent to and processed by a particular system. For example, detection of the wakeword "Alexa" by the wakeword detector 620 may result in sending data representing a user input to a first system 120 for processing while detection of the wakeword "Computer" by the wakeword detector may result in sending data representing a user input to a second system 120 for processing. The system may have a separate wakeword and system for different skills/systems (e.g., "Dungeon Master" for a game play skill/system 120) and/or such skills/systems may be coordinated by one or more skill(s) 690*a*, 690*b*, and/or 690*c* (collectively, "skills 690") of one or more systems 120.

Upon generation, the audio data 611 may be sent to an orchestrator component 630 of the first device 110 (and/or, in some implementations, the second device/system 120). The orchestrator component 630 may include memory and logic that enables the orchestrator component 630 to transmit various pieces and forms of data to various components of the system, as well as perform other operations as described herein.

The orchestrator component 630 may send the audio data 611 to a language processing component 692. The language processing component 692 (sometimes also referred to as a spoken language understanding (SLU) component) includes an automatic speech recognition (ASR) component 650 and a natural language understanding (NLU) component 660. The ASR component 650 may transcribe the audio data 611 into text data. The text data output by the ASR component 650 represents one or more than one (e.g., in the form of an N-best list) ASR hypotheses representing speech represented in the audio data 611. The ASR component 650 interprets the speech in the audio data 611 based on a similarity between the audio data 611 and pre-established language models. For example, the ASR component 650 may compare the audio data 611 with models for sounds (e.g., acoustic units such as phonemes, senons, phones, etc.) and sequences of sounds to identify words that match the sequence of sounds of the speech represented in the audio data 611. The ASR component 650 sends the text data generated thereby to an NLU component 660, via, in some embodiments, the orchestrator component 630. The text data sent from the ASR component 650 to the NLU component 660 may include a single top-scoring ASR hypothesis or may include an N-best list including multiple top-scoring ASR hypotheses. An N-best list may additionally include a respective score associated with each ASR hypothesis represented therein. The ASR component 650 is described in greater detail below with regard to FIG. 7.

The speech processing system 692 may further include a NLU component 660. The NLU component 660 may receive the text data from the ASR component. The NLU component 660 may attempts to make a semantic interpretation of the phrase(s) or statement(s) represented in the text data input therein by determining one or more meanings associated with the phrase(s) or statement(s) represented in the text data. The NLU component 660 may determine an intent representing an action that a user desires be performed and may determine information that allows a device (e.g., the device 110, the system(s) 120, a skill component 690, a skill system(s) 625, etc.) to execute the intent. For example, if the text data corresponds to "play the 5$^{th}$ Symphony by Beethoven," the NLU component 660 may determine an intent that the system output music and may identify "Beethoven" as an artist/composer and "5$^{th}$ Symphony" as the piece of music to be played. For further example, if the text data corresponds to "what is the weather," the NLU component 660 may determine an intent that the system output weather information associated with a geographic location of the device 110. In another example, if the text data corresponds to "turn off the lights," the NLU component 660 may determine an intent that the system turn off lights associated with the device 110 or the user 5. However, if the NLU component 660 is unable to resolve the entity—for example, because the entity is referred to by anaphora such as "this song" or "my next appointment"—the speech processing system 692 can send a decode request to another speech processing system 692 for information regarding the entity mention and/or other context related to the utterance. The speech processing system 692 may augment, correct, or base results data upon the audio data 611 as well as any data received from the other speech processing system 692.

The NLU component 660 may return NLU results data (which may include tagged text data, indicators of intent, etc.) back to the orchestrator 630. The orchestrator 630 may forward the NLU results data to a skill component(s) 690. If the NLU results data includes a single NLU hypothesis, the NLU component 660 and the orchestrator component 630 may direct the NLU results data to the skill component(s) 690 associated with the NLU hypothesis. If the NLU results data includes an N-best list of NLU hypotheses, the NLU component 660 and the orchestrator component 630 may direct the top scoring NLU hypothesis to a skill component(s) 690 associated with the top scoring NLU hypothesis. The system may also include a post-NLU ranker which may incorporate other information to rank potential interpretations determined by the NLU component 660. The device 110 may also include its own post-NLU ranker. The NLU component 660, post-NLU ranker, and other components are described in greater detail below with regard to FIG. 8.

A skill component may be software running on the first device 110 and/or second device/system(s) 120 that is akin to a software application. That is, a skill component 690 may enable the devices(s) 110/120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The devices(s) 110/120 may be configured with more than one skill component 690. For example, a weather service skill component may enable the devices(s) 110/120 to provide weather information, a car service skill component may enable the devices(s) 110/120 to book a trip with respect to a taxi or ride sharing service, a restaurant skill component may enable the devices(s) 110/120 to order a pizza with respect to the restaurant's online ordering system, etc. A skill component 690 may operate in conjunction between the devices(s) 110/120 and other devices, such as the device 110, in order to complete certain functions. Inputs to a skill component 690 may come from speech processing interactions or through other interactions or input sources. A skill component 690 may include hardware, software, firmware, or the like that may be dedicated to a particular skill component 690 or shared among different skill components 690.

A skill support system(s) 625 may communicate with a skill component(s) 690 within the devices(s) 110/120 and/or directly with the orchestrator component 630 or with other components. A skill support system(s) 625 may be configured to perform one or more actions. An ability to perform such action(s) may sometimes be referred to as a "skill." That is, a skill may enable a skill support system(s) 625 to execute specific functionality in order to provide data or perform some other action requested by a user. For example, a weather service skill may enable a skill support system(s) 625 to provide weather information to the devices(s) 110/120, a car service skill may enable a skill support system(s) 625 to book a trip with respect to a taxi or ride sharing service, an order pizza skill may enable a skill support system(s) 625 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The devices(s) 110/120 may be configured with a skill component 690 dedicated to interacting with the skill support system(s) 625. Unless expressly stated otherwise, reference to a skill, skill device, or skill component may include a skill component 690 operated by the devices(s) 110/120 and/or skill operated by the skill support system(s) 625. Moreover, the functionality described herein as a skill or skill may be referred to using many different terms, such as an action, bot, app, or the like. The skill 690 and or skill support system(s) 625 may return output data to the orchestrator 630.

The devices(s) 110/120 includes a language output component 693. The language output component 693 includes a natural language generation (NLG) component 679 and a text-to-speech (TTS) component 680. The NLG component 679 can generate text for purposes of TTS output to a user. For example the NLG component 679 may generate text corresponding to instructions corresponding to a particular action for the user to perform. The NLG component 679 may generate appropriate text for various outputs as described herein. The NLG component 679 may include one or more trained models configured to output text appropriate for a particular input. The text output by the NLG component 679 may become input for the TTS component 680 (e.g., output text data 910 discussed below). Alternatively or in addition, the TTS component 680 may receive text data from a skill 690 or other system component for output. The NLG component 679 may include a trained model. The NLG component 679 generates text data 910 from dialog data (e.g., received from a dialog manager) such that the output text data 910 has a natural feel and, in some embodiments, includes words and/or phrases specifically formatted for a requesting individual. The NLG may use templates to formulate responses. And/or the NLG system may include models trained from the various templates for forming the output text data 910. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 680.

The TTS component 680 may generate audio data (e.g., synthesized speech) from text data using one or more different methods. Text data input to the TTS component 680 may come from a skill component 690, the orchestrator component 630, or another component of the system. In one method of synthesis called unit selection, the TTS component 680 matches text data against a database of recorded speech. The TTS component 680 selects matching units of recorded speech and concatenates the units together to form audio data. In another method of synthesis called parametric synthesis, the TTS component 680 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system(s) 120 as image data or other representational data. The device 110 may further include circuitry for voice command-based control of the camera, allowing a user 5 to request capture of image or video data. The device 110 may process the commands locally or send audio data 611 representing the commands to the system(s) 120 for processing, after which the system(s) 120 may return output data that can cause the device 110 to engage its camera.

Upon generation by the first device 110 and/or receipt by the second device/system(s) 120, the image data 621 may be sent to an orchestrator component 630. The orchestrator component 630 may send the image data 621 to an image processing component 640. The image processing component 640 can perform computer vision functions such as object recognition, modeling, reconstruction, etc. For example, the image processing component 640 may detect a person, face, etc. The image processing component 640 is described in greater detail below with regard to FIG. 10. The device 110 may also include an image processing component 640.

In some implementations, the image processing component 640 can detect the presence of text in an image. In such implementations, the image processing component 640 can recognize the presence of text, convert the image data to text data, and send the resulting text data via the orchestrator component 630 to the language processing component 692 for processing by the NLU component 660.

The system 100 (either on device 110, system 120, or a combination thereof) may include profile storage 670 for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 670 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the devices(s) 110/120 with permission to allow the skill to execute with respect to the user's natural language user inputs. If a user does not enable a skill, the devices(s) 110/120 may not invoke the skill to execute with respect to the user's natural language user inputs.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 670 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 7:
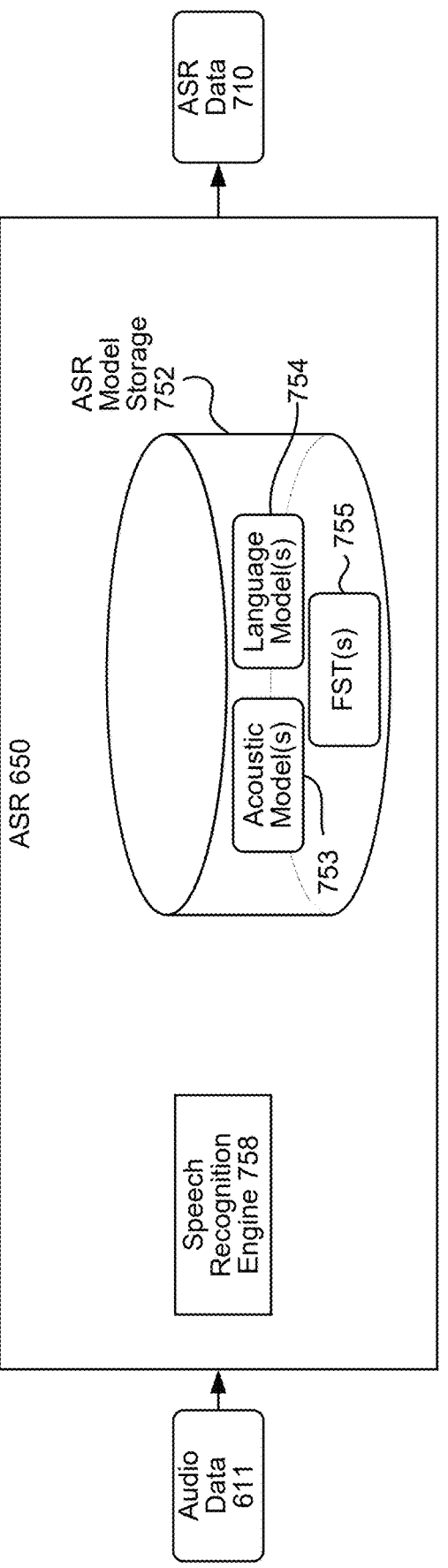
FIG. 7 is a conceptual diagram of an ASR component, according to embodiments of the present disclosure.

FIG. 7 is a conceptual diagram of an ASR component 650, according to embodiments of the present disclosure. The ASR component 650 may process the audio data to determine spoken language therein using one or more models as described below. The models may be updated by the techniques described herein. The device(s) 110 and/or system(s) 120 may include the ASR component 650. The ASR component 650 may located across different physical and/or virtual machines. The ASR component 650 may interpret a spoken natural language input based on the similarity between the spoken natural language input and pre-established language models 754 stored in an ASR model storage 752. For example, the ASR component 650 may compare the audio data with models for sounds (e.g., subword units or phonemes) and sequences of sounds to identify words that match the sequence of sounds spoken in the natural language input. Alternatively, the ASR component 650 may use a finite state transducer (FST) 755 to implement the language model functions.

When the ASR component 650 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 753 stored in the ASR model storage 752), and the likelihood that a particular word, which matches the sounds, would be included in the sentence at the specific location (e.g., using a language or grammar model 754). Based on the considered factors and the assigned confidence score, the ASR component 650 may output an ASR hypothesis that most likely matches the spoken natural language input, or may output multiple ASR hypotheses in the form of a lattice or an N-best list, with each ASR hypothesis corresponding to a respective score.

The ASR component 650 may include a speech recognition engine 758. The ASR component 650 receives audio data 611 (for example, received from a local device 110 having processed audio detected by a microphone by an acoustic front end (AFE) or other component). The speech recognition engine 758 compares the audio data 611 with acoustic models 753, language models 754, FST(s) 755, and/or other data models and information for recognizing the speech conveyed in the audio data. The audio data 611 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 758 may process the audio data 611 with reference to information stored in the ASR model storage 752. Feature vectors of the audio data 611 may arrive at the system 120 encoded, in which case they may be decoded prior to processing by the speech recognition engine 758.

The speech recognition engine 758 attempts to match received feature vectors to language acoustic units (e.g., phonemes) and words as known in the stored acoustic models 753, language models 6B54, and FST(s) 755. For example, audio data 611 may be processed by one or more acoustic model(s) 753 to determine acoustic unit data. The acoustic unit data may include indicators of acoustic units detected in the audio data 611 by the ASR component 650. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer.

An entity, or a slot representing one or more entities, can be represented by a series of n-grams.

The acoustic unit data may be processed using the language model 754 (and/or using FST 755) to determine ASR data 710. The ASR data 710 can include one or more hypotheses. One or more of the hypotheses represented in the ASR data 710 may then be sent to further components (such as the NLU component 660) for further processing as discussed herein. The ASR data 710 may include representations of text of an utterance, such as words, subword units, or the like.

The speech recognition engine 758 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 650 will output ASR hypotheses that make sense grammatically. The specific models used may be general models or may be models corresponding to a particular domain, such as music, banking, etc.

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 758 may use the acoustic model(s) 753 to attempt to match received audio feature vectors to words or subword acoustic units. An acoustic unit may be a senone, phoneme, phoneme in context, syllable, part of a syllable, syllable in context, or any other such portion of a word. The speech recognition engine 758 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 650 outputs ASR hypotheses that make sense grammatically.

The speech recognition engine 758 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 758, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 758 may also compute scores of branches of the paths based on language models or grammars. Language modeling involves determining scores for what words are likely to be used together to form coherent words and sentences. Application of a language model may improve the likelihood that the ASR component 650 correctly interprets the speech contained in the audio data. For example, for an input audio sounding like "hello," acoustic model processing that returns the potential phoneme paths of "H E L O", "HALO", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

FIG. 8 is a conceptual diagram of how natural language processing is performed, according to embodiments of the present disclosure. The NLU component 660 may process the text data to determine semantic meaning using one or more models as described below. The models may be updated by the techniques described herein. The device(s) 110 and/or system(s) 120 may include the NLU component 660. The NLU component 660 may located across different physical and/or virtual machines. FIG. 8 illustrates how NLU processing is performed on text data. The NLU component 660 may process text data including several ASR hypotheses of a single user input. For example, if the ASR component 650 outputs text data including an n-best list of ASR hypotheses, the NLU component 660 may process the text data with respect to all (or a portion of) the ASR hypotheses represented therein.

The NLU component 660 may annotate text data by parsing and/or tagging the text data. For example, for the text data "tell me the weather for Seattle," the NLU component 660 may tag "tell me the weather for Seattle" as an <OutputWeather>intent as well as separately tag "Seattle" as a location for the weather information.

The NLU component 660 may include a shortlister component 850. The shortlister component 850 selects skills that may execute with respect to ASR output data 710 input to the NLU component 660 (e.g., applications that may execute with respect to the user input). The ASR output data 710 (which may also be referred to as ASR data 710) may include representations of text of an utterance, such as words, subword units, or the like. The shortlister component 850 thus limits downstream, more resource intensive NLU processes to being performed with respect to skills that may execute with respect to the user input.

Without a shortlister component 850, the NLU component 660 may process ASR output data 710 input thereto with respect to every skill of the system, either in parallel, in series, or using some combination thereof. By implementing a shortlister component 850, the NLU component 660 may process ASR output data 710 with respect to only the skills that may execute with respect to the user input. This reduces total compute power and latency attributed to NLU processing.

The shortlister component 850 may include one or more trained models. The model(s) may be trained to recognize various forms of user inputs that may be received by the system(s) 120. For example, during a training period skill system(s) 625 associated with a skill may provide the system(s) 120 with training text data representing sample user inputs that may be provided by a user to invoke the skill. For example, for a ride sharing skill, a skill system(s) 625 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 850 may be trained, using the training text data representing sample user inputs, to determine other potentially related user input structures that users may try to use to invoke the particular skill. During training, the system(s) 120 may solicit the skill system(s) 625 associated with the skill regarding whether the determined other user input structures are permissible, from the perspective of the skill system(s) 625, to be used to invoke the skill. The alternate user input structures may be derived by one or more trained models during model training and/or may be based on user input structures provided by different skills. The skill system(s) 625 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 850 may be trained with respect to a different skill. Alternatively, the shortlister component 850 may use one trained model per domain, such as one trained model for skills associated with a weather domain, one trained model for skills associated with a ride sharing domain, etc.

The system(s) 120 may use the sample user inputs provided by a skill system(s) 625, and related sample user inputs potentially determined during training, as binary examples to train a model associated with a skill associated with the skill system(s) 625. The model associated with the particular skill may then be operated at runtime by the shortlister component 850. For example, some sample user inputs may be positive examples (e.g., user inputs that may be used to invoke the skill). Other sample user inputs may be negative examples (e.g., user inputs that may not be used to invoke the skill).

As described above, the shortlister component 850 may include a different trained model for each skill of the system, a different trained model for each domain, or some other combination of trained model(s). For example, the shortlister component 850 may alternatively include a single model.

The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 850 to output indications of only a portion of the skills that the ASR output data 710 may relate to. For example, a user input may correspond to "tell me about Tom Collins." If the model is clustered based on domain, the shortlister component 850 may determine the user input corresponds to a recipe skill (e.g., a drink recipe) even though the user input may also correspond to an information skill (e.g., including information about a person named Tom Collins).

The NLU component 660 may include one or more recognizers 863. In at least some embodiments, a recognizer 863 may be associated with a skill system 625 (e.g., the recognizer may be configured to interpret text data to correspond to the skill system 625). In at least some other examples, a recognizer 863 may be associated with a domain such as smart home, video, music, weather, custom, etc. (e.g., the recognizer may be configured to interpret text data to correspond to the domain).

If the shortlister component 850 determines ASR output data 710 is potentially associated with multiple domains, the recognizers 863 associated with the domains may process the ASR output data 710, while recognizers 863 not indicated in the shortlister component 850's output may not process the ASR output data 710. The "shortlisted" recognizers 863 may process the ASR output data 710 in parallel, in series, partially in parallel, etc. For example, if ASR output data 710 potentially relates to both a communications domain and a music domain, a recognizer associated with the communications domain may process the ASR output data 710 in parallel, or partially in parallel, with a recognizer associated with the music domain processing the ASR output data 710.

Each recognizer 863 may include a named entity recognition (NER) component 862. The NER component 862 attempts to identify grammars and lexical information that may be used to construe meaning with respect to text data input therein. The NER component 862 identifies portions of text data that correspond to a named entity associated with a domain, associated with the recognizer 863 implementing the NER component 862. The NER component 862 (or other component of the NLU component 660) may also determine whether a word refers to an entity whose identity is not explicitly mentioned in the text data, for example "him," "her," "it" or other anaphora, exophora, or the like.

Each recognizer 863, and more specifically each NER component 862, may be associated with a particular grammar database 876, a particular set of intents/actions 874, and a particular personalized lexicon 886. The grammar databases 876, and intents/actions 874 may be stored in an NLU storage 873. Each gazetteer 884 may include domain/skill-indexed lexical information associated with a particular user and/or device 110. For example, a Gazetteer A (884a) includes skill-indexed lexical information 886aa to 886an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 862 applies grammar information 876 and lexical information 886 associated with a domain (associated with the recognizer 863 implementing the NER component 862) to determine a mention of one or more entities in text data. In this manner, the NER component 862 identifies "slots" (each corresponding to one or more particular words in text data) that may be useful for later processing. The NER component 862 may also label each slot with a type (e.g., noun, place, city, artist name, song name, etc.).

Each grammar database 876 includes the names of entities (i.e., nouns) commonly found in speech about the particular domain to which the grammar database 876 relates, whereas the lexical information 886 is personalized to the user and/or the device 110 from which the user input originated. For example, a grammar database 876 associated with a shopping domain may include a database of words commonly used when people discuss shopping.

A downstream process called entity resolution (discussed in detail elsewhere herein) links a slot of text data to a specific entity known to the system. To perform entity resolution, the NLU component 660 may utilize gazetteer information (884a-884n) stored in an entity library storage 882. The gazetteer information 884 may be used to match text data (representing a portion of the user input) with text data representing known entities, such as song titles, contact names, etc. Gazetteers 884 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 863 may also include an intent classification (IC) component 864. An IC component 864 parses text data to determine an intent(s) (associated with the domain associated with the recognizer 863 implementing the IC component 864) that potentially represents the user input. An intent represents to an action a user desires be performed. An IC component 864 may communicate with a database 874 of words linked to intents. For example, a music intent database may link words and phrases such as "quiet," "volume off," and "mute" to a <Mute>intent. An IC component 864 identifies potential intents by comparing words and phrases in text data (representing at least a portion of the user input) to the words and phrases in an intents database 874 (associated with the domain that is associated with the recognizer 863 implementing the IC component 864).

The intents identifiable by a specific IC component 864 are linked to domain-specific (i.e., the domain associated with the recognizer 863 implementing the IC component 864) grammar frameworks 876 with "slots" to be filled. Each slot of a grammar framework 876 corresponds to a portion of text data that the system believes corresponds to an entity. For example, a grammar framework 876 corresponding to a <PlayMusic>intent may correspond to text data sentence structures such as "Play {Artist Name}," "Play {Album Name}," "Play {Song name}," "Play {Song name} by {Artist Name}," etc. However, to make entity resolution more flexible, grammar frameworks 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886 (associated with the domain associated with the recognizer 863 implementing the NER component 862), attempting to match words and phrases in text data the NER component 862 previously tagged as a grammatical object or object modifier with those identified in the lexicon 886.

An NER component 862 may perform semantic tagging, which is the labeling of a word or combination of words according to their type/semantic meaning. An NER component 862 may parse text data using heuristic grammar rules, or a model may be constructed using techniques such as Hidden Markov Models, maximum entropy models, log linear models, conditional random fields (CRF), and the like. For example, an NER component 862 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb based on a word database associated with the music domain, which an IC component 864 (also implemented by the music domain recognizer) may determine corresponds to a <PlayMusic>intent. At this stage, no determination has been made as to the meaning of "mother's little helper" or "the rolling stones," but based on grammar rules and models, the NER component 862 has determined the text of these phrases relates to the grammatical object (i.e., entity) of the user input represented in the text data.

An NER component 862 may tag text data to attribute meaning thereto. For example, an NER component 862 may tag "play mother's little helper by the rolling stones" as: {domain} Music, {intent}<PlayMusic>, {artist name} rolling stones, {media type} SONG, and {song title} mother's little helper. For further example, the NER component 862 may tag "play songs by the rolling stones" as: {domain} Music, {intent}<PlayMusic>, {artist name} rolling stones, and {media type} SONG.

The shortlister component 850 may receive ASR output data 710 output from the ASR component 650 or output from the device 110. The ASR component 650 may embed the ASR output data 710 into a form processable by a trained model(s) using sentence embedding techniques as known in the art. Sentence embedding results in the ASR output data 710 including text in a structure that enables the trained models of the shortlister component 850 to operate on the ASR output data 710. For example, an embedding of the ASR output data 710 may be a vector representation of the ASR output data 710.

The shortlister component 850 may make binary determinations (e.g., yes or no) regarding which domains relate to the ASR output data 710. The shortlister component 850 may make such determinations using the one or more trained models described herein above. If the shortlister component 850 implements a single trained model for each domain, the shortlister component 850 may simply run the models that are associated with enabled domains as indicated in a user profile associated with the device 110 and/or user that originated the user input.

The shortlister component 850 may generate n-best list data representing domains that may execute with respect to the user input represented in the ASR output data 710. The size of the n-best list represented in the n-best list data is configurable. In an example, the n-best list data may indicate every domain of the system as well as contain an indication, for each domain, regarding whether the domain is likely capable to execute the user input represented in the ASR output data 710. In another example, instead of indicating every domain of the system, the n-best list data may only indicate the domains that are likely to be able to execute the user input represented in the ASR output data 710. In yet another example, the shortlister component 850 may implement thresholding such that the n-best list data may indicate no more than a maximum number of domains that may execute the user input represented in the ASR output data 710. In an example, the threshold number of domains that may be represented in the n-best list data is ten. In another example, the domains included in the n-best list data may be limited by a threshold a score, where only domains indicating a likelihood to handle the user input is above a certain score (as determined by processing the ASR output data 710 by the shortlister component 850 relative to such domains) are included in the n-best list data.

The ASR output data 710 may correspond to more than one ASR hypothesis. When this occurs, the shortlister component 850 may output a different n-best list (represented in the n-best list data) for each ASR hypothesis. Alternatively, the shortlister component 850 may output a single n-best list representing the domains that are related to the multiple ASR hypotheses represented in the ASR output data 710.

As indicated above, the shortlister component 850 may implement thresholding such that an n-best list output therefrom may include no more than a threshold number of entries. If the ASR output data 710 includes more than one ASR hypothesis, the n-best list output by the shortlister component 850 may include no more than a threshold number of entries irrespective of the number of ASR hypotheses output by the ASR component 650. Alternatively or in addition, the n-best list output by the shortlister component 850 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 710, the shortlister component 850 may generate confidence scores representing likelihoods that domains relate to the ASR output data 710. If the shortlister component 850 implements a different trained model for each domain, the shortlister component 850 may generate a different confidence score for each individual domain trained model that is run. If the shortlister component 850 runs the models of every domain when ASR output data 710 is received, the shortlister component 850 may generate a different confidence score for each domain of the system. If the shortlister component 850 runs the models of only the domains that are associated with skills indicated as enabled in a user profile associated with the device 110 and/or user that originated the user input, the shortlister component 850 may only generate a different confidence score for each domain associated with at least one enabled skill. If the shortlister component 850 implements a single trained model with domain specifically trained portions, the shortlister component 850 may generate a different confidence score for each domain who's specifically trained portion is run. The shortlister component 850 may perform matrix vector modification to obtain confidence scores for all domains of the system in a single instance of processing of the ASR output data 710.

Figure 9:
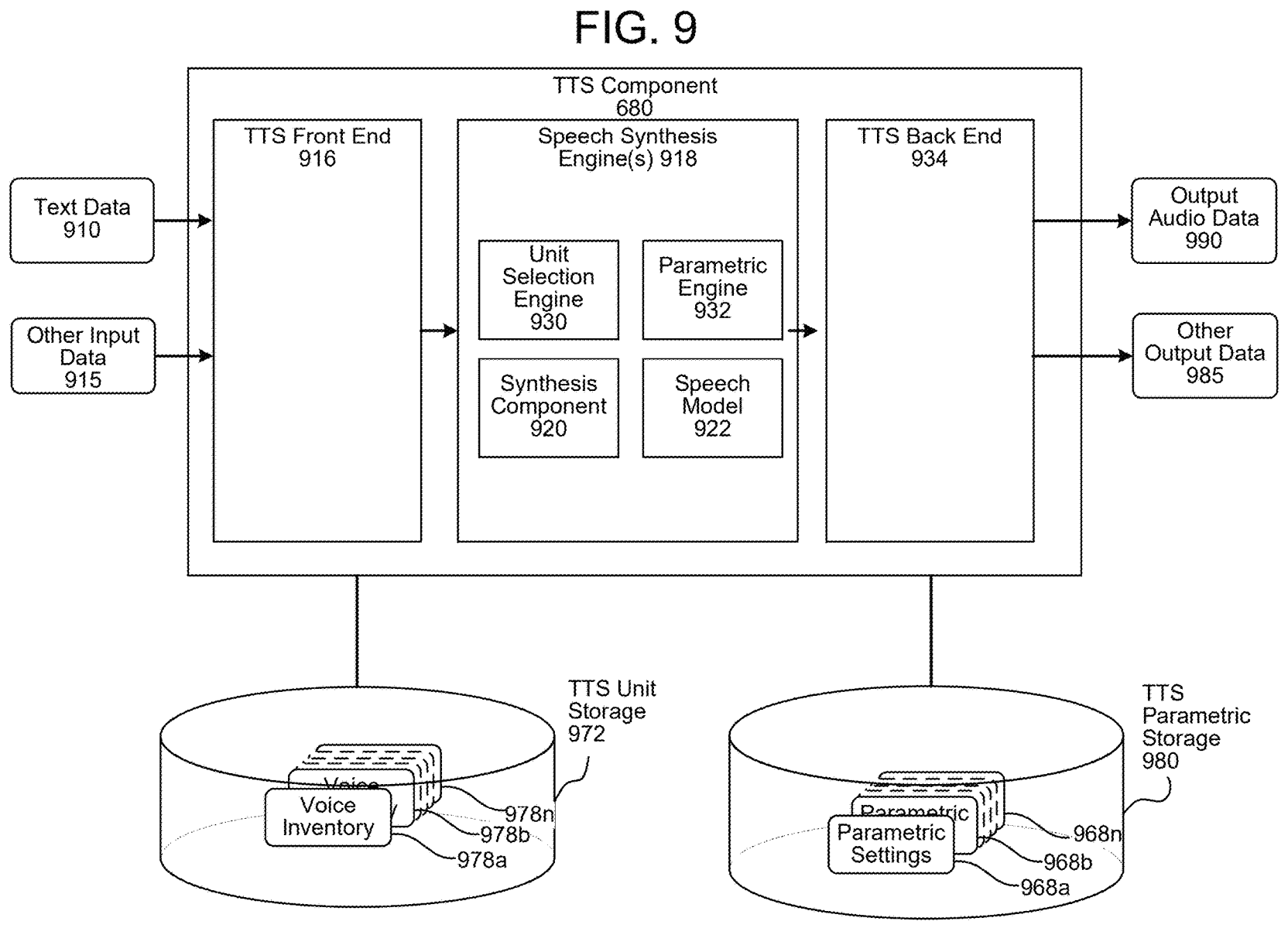

FIG. 9 is a conceptual diagram of text-to-speech components according to embodiments of the present disclosure. The TTS component 680 may process the text data to determine semantic meaning using one or more models as described below. The models may be updated by the techniques described herein. The device(s) 110 and/or system(s) 120 may include the TTS component 680. The TTS component 680 may located across different physical and/or virtual machines. Components of a system that may be used to perform unit selection, parametric TTS processing, and/or model-based audio synthesis are shown in FIG. 9. As shown in FIG. 9, the TTS component/processor 680 may include a TTS front end 916, a speech synthesis engine 918, TTS unit storage 972, TTS parametric storage 980, and a TTS back end 934. The TTS unit storage 972 may include, among other things, voice inventories 978a-978n that may include pre-recorded audio segments (called units) to be used by the unit selection engine 930 when performing unit selection synthesis as described below. The TTS parametric storage 980 may include, among other things, parametric settings 968a-968n that may be used by the parametric synthesis engine 932 when performing parametric synthesis as described below. A particular set of parametric settings 968 may correspond to a particular voice profile (e.g., whispered speech, excited speech, etc.).

In various embodiments of the present disclosure, model-based synthesis of audio data may be performed using by a speech model 922 and a TTS front end 916. The TTS front end 916 may be the same as front ends used in traditional unit selection or parametric systems. In other embodiments, some or all of the components of the TTS front end 916 are based on other trained models. The present disclosure is not, however, limited to any particular type of TTS front end 916. The speech model 922 may be used to synthesize speech without requiring the TTS unit storage 972 or the TTS parametric storage 980, as described in greater detail below.

TTS component receives text data 910. Although the text data 910 in FIG. 9 is input into the TTS component 680, it may be output by other component(s) (such as a skill 690, NLU component 660, NLG component 679 or other component) and may be intended for output by the system. Thus in certain instances text data 910 may be referred to as "output text data." Further, the data 910 may not necessarily be text, but may include other data (such as symbols, code, other data, etc.) that may reference text (such as an indicator of a word) that is to be synthesized. Thus data 910 may come in a variety of forms. The TTS front end 916 transforms the data 910 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine 918. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 910, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 916 may also process other input data 915, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 910 and/or the text for a TTS request may be accompanied by separate metadata indicating what text should be whispered (or have some other indicated audio characteristic). The speech synthesis engine 918 may compare the annotated phonetic units models and information stored in the TTS unit storage 972 and/or TTS parametric storage 980 for converting the input text into speech. The TTS front end 916 and speech synthesis engine 918 may include their own controller(s)/ processor(s) and memory or they may use the controller/ processor and memory of the system 120, device 110, or other device, for example. Similarly, the instructions for operating the TTS front end 916 and speech synthesis engine 918 may be located within the TTS component 680, within the memory and/or storage of the system 120, device 110, or within an external device.

Text data 910 input into the TTS component 680 may be sent to the TTS front end 916 for processing. The front end 916 may include components for performing text normalization, linguistic analysis, linguistic prosody generation, or other such components. During text normalization, the TTS front end 916 may first process the text input and generate standard text, converting such things as numbers, abbreviations (such as Apt., St., etc.), symbols ($, %, etc.) into the equivalent of written out words.

During linguistic analysis, the TTS front end 916 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 680 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS unit storage 972. The linguistic analysis performed by the TTS front end 916 may also identify different grammatical components such as prefixes, suffixes, phrases, punctuation, syntactic boundaries, or the like. Such grammatical components may be used by the TTS component 680 to craft a natural-sounding audio waveform output. The language dictionary may also include letter-to-sound rules and other tools that may be used to pronounce previously unidentified words or letter combinations that may be encountered by the TTS component 680. Generally, the more information included in the language dictionary, the higher quality the speech output.

Based on the linguistic analysis the TTS front end 916 may then perform linguistic prosody generation where the phonetic units are annotated with desired prosodic characteristics, also called acoustic features, which indicate how the desired phonetic units are to be pronounced in the eventual output speech. During this stage the TTS front end 916 may consider and incorporate any prosodic annotations that accompanied the text input to the TTS component 680. Such acoustic features may include syllable-level features, word-level features, emotion, speaker, accent, language, pitch, energy, duration, and the like. Application of acoustic features may be based on prosodic models available to the TTS component 680. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 916, which may be referred to as a symbolic linguistic representation, may include a sequence of phonetic units annotated with prosodic characteristics. This symbolic linguistic representation may be sent to the speech synthesis engine 918, which may also be known as a synthesizer, for conversion into an audio waveform of speech for output to an audio output device and eventually to a user. The speech synthesis engine 918 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 918 may perform speech synthesis using one or more different methods. In one method of synthesis called unit selection, described further below, a unit selection engine 930 matches the symbolic linguistic representation created by the TTS front end 916 against a database of recorded speech, such as a database (e.g., TTS unit storage 972) storing information regarding one or more voice corpuses (e.g., voice inventories 978*a*-*n*). Each voice inventory may correspond to various segments of audio that was recorded by a speaking human, such as a voice actor, where the segments are stored in an individual inventory 978 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short. wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 930 may then use the information about each unit to select units to be joined together to form the speech output.

The unit selection engine 930 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 920) to form output audio data 990 representing synthesized speech. Using all the information in the unit database, a unit selection engine 930 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis-called parametric synthesis-parameters such as frequency, volume, noise, are varied by a parametric synthesis engine 932, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 920) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 680 may be configured to perform TTS processing in multiple languages. For each language, the TTS component 680 may include specially configured data, instructions and/or components to synthesize speech in the desired language(s). To improve performance, the TTS component 680 may revise/update the contents of the TTS unit storage 972 based on feedback of the results of TTS processing, thus enabling the TTS component 680 to improve speech synthesis.

The TTS unit storage 972 may be customized for an individual user based on his/her individualized desired speech output. In particular, the speech unit stored in a unit database may be taken from input audio data of the user speaking. For example, to create the customized speech output of the system, the system may be configured with multiple voice inventories 978*a*-978*n*, where each unit database is configured with a different "voice" to match desired speech qualities. Such voice inventories may also be linked to user accounts. The voice selected by the TTS component 680 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 978 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 968) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 930 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 930. As part of unit selection, the unit selection engine 930 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 972 or in another storage component. For example, different unit selection databases may be stored in TTS unit storage 972. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 918 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 680 may include an acoustic model, or other models, which may convert a symbolic linguistic representation into a synthetic acoustic waveform of the text input based on audio signal manipulation. The acoustic model includes rules which may be used by the parametric synthesis engine 932 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 916.

The parametric synthesis engine 932 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 918, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 932 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 932 may lead to a number of potential audio output sequences. Based on the acoustic model and other potential models, the potential audio output sequences may be scored according to a confidence level of the parametric synthesis engine 932. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 968, which may represent acoustic settings matching a particular parametric "voice", may be used by the synthesis component 920 to ultimately create the output audio data 990.

When performing unit selection, after a unit is selected by the unit selection engine 930, the audio data corresponding to the unit may be passed to the synthesis component 920. The synthesis component 920 may then process the audio data of the unit to create modified audio data where the modified audio data reflects a desired audio quality. The synthesis component 920 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 680. For each unit that corresponds to the selected portion, the synthesis component 920 may process the audio data for that unit to create a modified unit audio data. The modified unit audio data may then be concatenated to form the output audio data 990. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 680. In that case, other output data 985 may be output along with the output audio data 990 so that an ultimate playback device (e.g., device 110) receives instructions for playback that can assist in creating the desired output audio. Thus, the other output data 985 may include instructions or other data indicating playback device settings (such as volume, playback rate, etc.) or other data indicating how output audio data including synthesized speech should be output. For example, for whispered speech, the output audio data 990 may include other output data 985 that may include a prosody tag or other indicator that instructs the device 110 to slow down the playback of the output audio data 990, thus making the ultimate audio sound more like whispered speech, which is typically slower than normal speech. In another example, the other output data 985 may include a volume tag that instructs the device 110 to output the speech at a volume level less than a current volume setting of the device 110, thus improving the quiet whisper effect.

Figure 10:
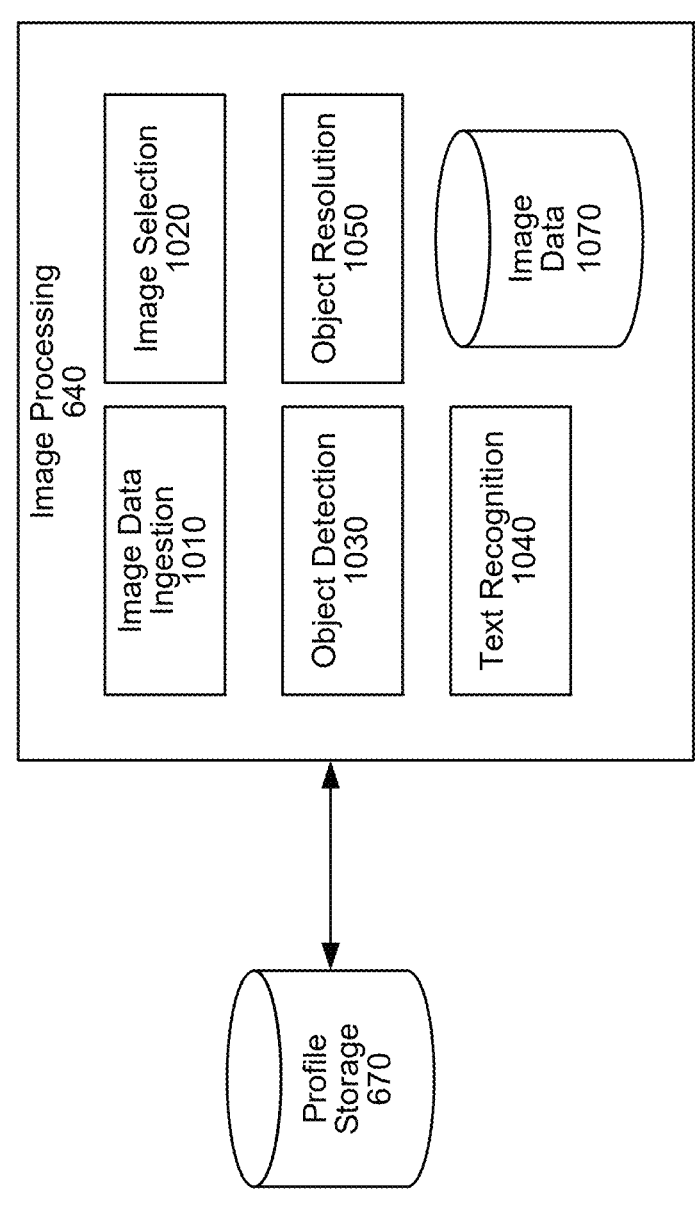
FIG. 10 is a conceptual diagram of an image processing component according to embodiments of the present disclosure.

FIG. 10 is a conceptual diagram of an image processing component 640 according to embodiments of the present disclosure. The image processing component 640 may process still and/or video image data using one or more models as described below. The models may be updated by the techniques described herein. The device(s) 110 and/or system(s) 120 may include the image processing component 640. The image processing component 640 may located across different physical and/or virtual machines. The image processing component 640 may receive and analyze image data (which may include single images or a plurality of images such as in a video feed). The image processing component 640 may work with other components of the system 120 to perform various operations. For example the image processing component 640 may assist with user recognition using image data. The image processing component 640 may also include or otherwise be associated with image data storage 1070 which may store aspects of image data used by image processing component 640. The image data may be of different formats such as JPEG, GIF, BMP, MPEG, video formats, and the like.

Image matching algorithms, such as those used by image processing component 640, may take advantage of the fact that an image of an object or scene contains a number of feature points. Feature points are specific points in an image which are robust to changes in image rotation, scale, viewpoint, or lighting conditions. This means that these feature points will often be present in both the images to be compared, even if the two images differ. These feature points may also be known as "points of interest." Therefore, a first stage of the image matching algorithm may include finding these feature points in the image. An image pyramid may be constructed to determine the feature points of an image. An image pyramid is a scale-space representation of the image, e.g., it contains various pyramid images, each of which is a representation of the image at a particular scale. The scale-space representation enables the image matching algorithm to match images that differ in overall scale (such as images taken at different distances from an object). Pyramid images may be smoothed and downsampled versions of an original image.

To build a database of object images, with multiple objects per image, a number of different images of an object may be taken from different viewpoints. From those images, feature points may be extracted and pyramid images constructed. Multiple images from different points of view of each particular object may be taken and linked within the database (for example within a tree structure described below). The multiple images may correspond to different viewpoints of the object sufficient to identify the object from any later angle that may be included in a user's query image. For example, a shoe may look very different from a bottom view than from a top view than from a side view. For certain objects, this number of different image angles may be 6 (top, bottom, left side, right side, front, back), for other objects this may be more or less depending on various factors, including how many images should be taken to ensure the object may be recognized in an incoming query image. With different images of the object available, it is more likely that an incoming image from a user may be recognized by the system and the object identified, even if the user's incoming image is taken at a slightly different angle.

This process may be repeated for multiple objects. For large databases, such as an online shopping database where a user may submit an image of an object to be identified, this process may be repeated thousands, if not millions of times to construct a database of images and data for image matching. The database also may continually be updated and/or refined to account for a changing catalog of objects to be recognized.

When configuring the database, pyramid images, feature point data, and/or other information from the images or objects may be used to cluster features and build a tree of objects and images, where each node of the tree will keep lists of objects and corresponding features. The tree may be configured to group visually significant subsets of images/features to ease matching of submitted images for object detection. Data about objects to be recognized may be stored by the system in image data 1070, profile storage 670, or other storage component.

Image selection component 1020 may select desired images from input image data to use for image processing at runtime. For example, input image data may come from a series of sequential images, such as a video stream where each image is a frame of the video stream. These incoming images need to be sorted to determine which images will be selected for further object recognition processing as performing image processing on low quality images may result in an undesired user experience. To avoid such an undesirable user experience, the time to perform the complete recognition process, from first starting the video feed to delivering results to the user, should be as short as possible. As images in a video feed may come in rapid succession, the image processing component 640 may be configured to select or discard an image quickly so that the system can, in turn, quickly process the selected image and deliver results to a user. The image selection component 1020 may select an image for object recognition by computing a metric/feature for each frame in the video feed and selecting an image for processing if the metric exceeds a certain threshold. While FIG. 10 illustrates image selection component 1020 as part of system 120, it may also be located on device 110 so that the device may select only desired image(s) to send to system 120, thus avoiding sending too much image data to system 120 (thus expending unnecessary computing/communication resources). Thus the device may select only the best quality images for purposes of image analysis.

The metrics used to select an image may be general image quality metrics (focus, sharpness, motion, etc.) or may be customized image quality metrics. The metrics may be computed by software components or hardware components. For example, the metrics may be derived from output of device sensors such as a gyroscope, accelerometer, field sensors, inertial sensors, camera metadata, or other components. The metrics may thus be image based (such as a statistic derived from an image or taken from camera metadata like focal length or the like) or may be non-image based (for example, motion data derived from a gyroscope, accelerometer, GPS sensor, etc.). As images from the video feed are obtained by the system, the system, such as a device, may determine metric values for the image. One or more metrics may be determined for each image. To account for temporal fluctuation, the individual metrics for each respective image may be compared to the metric values for previous images in the image feed and thus a historical metric value for the image and the metric may be calculated. This historical metric may also be referred to as a historical metric value. The historical metric values may include representations of certain metric values for the image compared to the values for that metric for a group of different images in the same video feed. The historical metric(s) may be processed using a trained classifier model to select which images are suitable for later processing.

For example, if a particular image is to be measured using a focus metric, which is a numerical representation of the focus of the image, the focus metric may also be computed for the previous N frames to the particular image. N is a configurable number and may vary depending on system constraints such as latency, accuracy, etc. For example, N may be 30 image frames, representing, for example, one second of video at a video feed of 30 frames-per-second. A mean of the focus metrics for the previous N images may be computed, along with a standard deviation for the focus metric. For example, for an image number X+1 in a video feed sequence, the previous N images, may have various metric values associated with each of them. Various metrics such as focus, motion, and contrast are discussed, but others are possible. A value for each metric for each of the N images may be calculated, and then from those individual values, a mean value and standard deviation value may be calculated. The mean and standard deviation (STD) may then be used to calculate a normalized historical metric value, for example STD (metric)/MEAN (metric). Thus, the value of a historical focus metric at a particular image may be the STD divided by the mean for the focus metric for the previous N frames. For example, historical metrics (HIST) for focus, motion, and contrast may be expressed as:

$$\text{HIST}_{Focus} = \frac{STD_{Focus}}{\text{MEAN}_{Focus}}$$

$$\text{HIST}_{Motion} = \frac{STD_{Motion}}{\text{MEAN}_{Motion}}$$

$$\text{HIST}_{Contrast} = \frac{STD_{Contrast}}{\text{MEAN}_{Contrast}}$$

In one embodiment the historical metric may be further normalized by dividing the above historical metrics by the number of frames N, particularly in situations where there are small number of frames under consideration for the particular time window. The historical metrics may be recalculated with each new image frame that is received as part of the video feed. Thus each frame of an incoming video feed may have a different historical metric from the frame before. The metrics for a particular image of a video feed may be compared historical metrics to select a desirable image on which to perform image processing.

Image selection component 1020 may perform various operations to identify potential locations in an image that may contain recognizable text. This process may be referred to as glyph region detection. A glyph is a text character that has yet to be recognized. If a glyph region is detected, various metrics may be calculated to assist the eventual optical character recognition (OCR) process. For example, the same metrics used for overall image selection may be re-used or recalculated for the specific glyph region. Thus, while the entire image may be of sufficiently high quality, the quality of the specific glyph region (i.e. focus, contrast, intensity, etc.) may be measured. If the glyph region is of poor quality, the image may be rejected for purposes of text recognition.

Image selection component 1020 may generate a bounding box that bounds a line of text. The bounding box may bound the glyph region. Value(s) for image/region suitability metric(s) may be calculated for the portion of the image in the bounding box. Value(s) for the same metric(s) may also be calculated for the portion of the image outside the bounding box. The value(s) for inside the bounding box may then be compared to the value(s) outside the bounding box to make another determination on the suitability of the image. This determination may also use a classifier.

Additional features may be calculated for determining whether an image includes a text region of sufficient quality for further processing. The values of these features may also be processed using a classifier to determine whether the image contains true text character/glyphs or is otherwise suitable for recognition processing. To locally classify each candidate character location as a true text character/glyph location, a set of features that capture salient characteristics of the candidate location is extracted from the local pixel pattern. Such features may include aspect ratio (bounding box width/bounding box height), compactness ($4*\pi*$candidate glyph area/(perimeter)$^2$), solidity (candidate glyph area/bounding box area), stroke-width to width ratio (maximum stroke width/bounding box width), stroke-width to height ratio (maximum stroke width/bounding box height), convexity (convex hull perimeter/perimeter), raw compactness ($4*\pi*$(candidate glyph number of pixels)/(perimeter) $2$), number of holes in candidate glyph, or other features. Other candidate region identification techniques may be used. For example, the system may use techniques involving maximally stable extremal regions (MSERs). Instead of MSERs (or in conjunction with MSERs), the candidate locations may be identified using histogram of oriented gradients (HoG) and Gabor features.

If an image is sufficiently high quality it may be selected by image selection 1020 for sending to another component (e.g., from device to system 120) and/or for further processing, such as text recognition, object detection/resolution, etc.

The feature data calculated by image selection component 1020 may be sent to other components such as text recognition component 1040, objection detection component 1030, object resolution component 1050, etc. so that those components may use the feature data in their operations. Other preprocessing operations such as masking, binarization, etc. may be performed on image data prior to recognition/resolution operations. Those preprocessing operations may be performed by the device prior to sending image data or by system 120.

Object detection component 1030 may be configured to analyze image data to identify one or more objects represented in the image data. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

The object detection component 1030 may process at least a portion of the image data to determine feature data. The feature data is indicative of one or more features that are depicted in the image data. For example, the features may be face data, or other objects, for example as represented by stored data in profile storage 670. Other examples of features may include shapes of body parts or other such features that identify the presence of a human. Other examples of features may include edges of doors, shadows on the wall, texture on the walls, portions of artwork in the environment, and so forth to identify a space. The object detection component 1030 may compare detected features to stored data (e.g., in profile storage 670, image data 1070, or other storage) indicating how detected features may relate to known objects for purposes of object detection.

Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

One statistical algorithm that may be used for geometric matching of images is the Random Sample Consensus (RANSAC) algorithm, although other variants of RANSAC-like algorithms or other statistical algorithms may also be used. In RANSAC, a small set of putative correspondences is randomly sampled. Thereafter, a geometric transformation is generated using these sampled feature points. After generating the transformation, the putative correspondences that fit the model are determined. The putative correspondences that fit the model and are geometrically consistent and called "inliers." The inliers are pairs of feature points, one from each image, that may correspond to each other, where the pair fits the model within a certain comparison threshold for the visual (and other) contents of the feature points, and are geometrically consistent (as explained below relative to motion estimation). A total number of inliers may be determined. The above mentioned steps may be repeated until the number of repetitions/trials is greater than a predefined threshold or the number of inliers for the image is sufficiently high to determine an image as a match (for example the number of inliers exceeds a threshold). The RANSAC algorithm returns the model with the highest number of inliers corresponding to the model.

To further test pairs of putative corresponding feature points between images, after the putative correspondences are determined, a topological equivalence test may be performed on a subset of putative correspondences to avoid forming a physically invalid transformation. After the transformation is determined, an orientation consistency test may be performed. An offset point may be determined for the feature points in the subset of putative correspondences in one of the images. Each offset point is displaced from its corresponding feature point in the direction of the orientation of that feature point. The transformation is discarded based on orientation of the feature points obtained from the feature points in the subset of putative correspondences if any one of the images being matched and its offset point differs from an estimated orientation by a predefined limit. Subsequently, motion estimation may be performed using the subset of putative correspondences which satisfy the topological equivalence test.

Motion estimation (also called geometric verification) may determine the relative differences in position between corresponding pairs of putative corresponding feature points. A geometric relationship between putative corresponding feature points may determine where in one image (e.g., the image input to be matched) a particular point is found relative to that potentially same point in the putatively matching image (i.e., a database image). The geometric relationship between many putatively corresponding feature point pairs may also be determined, thus creating a potential map between putatively corresponding feature points across images. Then the geometric relationship of these points may be compared to determine if a sufficient number of points correspond (that is, if the geometric relationship between point pairs is within a certain threshold score for the geometric relationship), thus indicating that one image may represent the same real-world physical object, albeit from a different point of view. Thus, the motion estimation may determine that the object in one image is the same as the object in another image, only rotated by a certain angle or viewed from a different distance, etc.

The above processes of image comparing feature points and performing motion estimation across putative matching images may be performed multiple times for a particular query image to compare the query image to multiple potential matches among the stored database images. Dozens of comparisons may be performed before one (or more) satisfactory matches that exceed the relevant thresholds (for both matching feature points and motion estimation) may be found. The thresholds may also include a confidence threshold, which compares each potential matching image with a confidence score that may be based on the above processing. If the confidence score exceeds a certain high threshold, the system may stop processing additional candidate matches and simply select the high confidence match as the final match. Or if, the confidence score of an image is within a certain range, the system may keep the candidate image as a potential match while continuing to search other database images for potential matches. In certain situations, multiple database images may exceed the various matching/confidence thresholds and may be determined to be candidate matches. In this situation, a comparison of a weight or confidence score may be used to select the final match, or some combination of candidate matches may be used to return results. The system may continue attempting to match an image until a certain number of potential matches are identified, a certain confidence score is reached (either individually with a single potential match or among multiple matches), or some other search stop indicator is triggered. For example, a weight may be given to each object of a potential matching database image. That weight may incrementally increase if multiple query images (for example, multiple frames from the same image stream) are found to be matches with database images of a same object. If that weight exceeds a threshold, a search stop indicator may be triggered and the corresponding object selected as the match.

Once an object is detected by object detection component 1030 the system may determine which object is actually seen using object resolution component 1050. Thus one component, such as object detection component 1030, may detect if an object is represented in an image while another component, object resolution component 1050 may determine which object is actually represented. Although illustrated as separate components, the system may also be configured so that a single component may perform both object detection and object resolution.

For example, when a database image is selected as a match to the query image, the object in the query image may be determined to be the object in the matching database image. An object identifier associated with the database image (such as a product ID or other identifier) may be used to return results to a user, along the lines of "I see you holding object X" along with other information, such giving the user information about the object. If multiple potential matches are returned (such as when the system can't determine exactly what object is found or if multiple objects appear in the query image) the system may indicate to the user that multiple potential matching objects are found and may return information/options related to the multiple objects.

In another example, object detection component 1030 may determine that a type of object is represented in image data and object resolution component 1050 may then determine which specific object is represented. The object resolution component 1050 may also make available specific data about a recognized object to further components so that further operations may be performed with regard to the resolved object.

Object detection component 1030 may be configured to process image data to detect a representation of an approximately two-dimensional (2D) object (such as a piece of paper) or a three-dimensional (3D) object (such as a face). Such recognition may be based on available stored data (e.g., 670, 1070, etc.) which in turn may have been provided through an image data ingestion process managed by image data ingestion component 1010. Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 11:
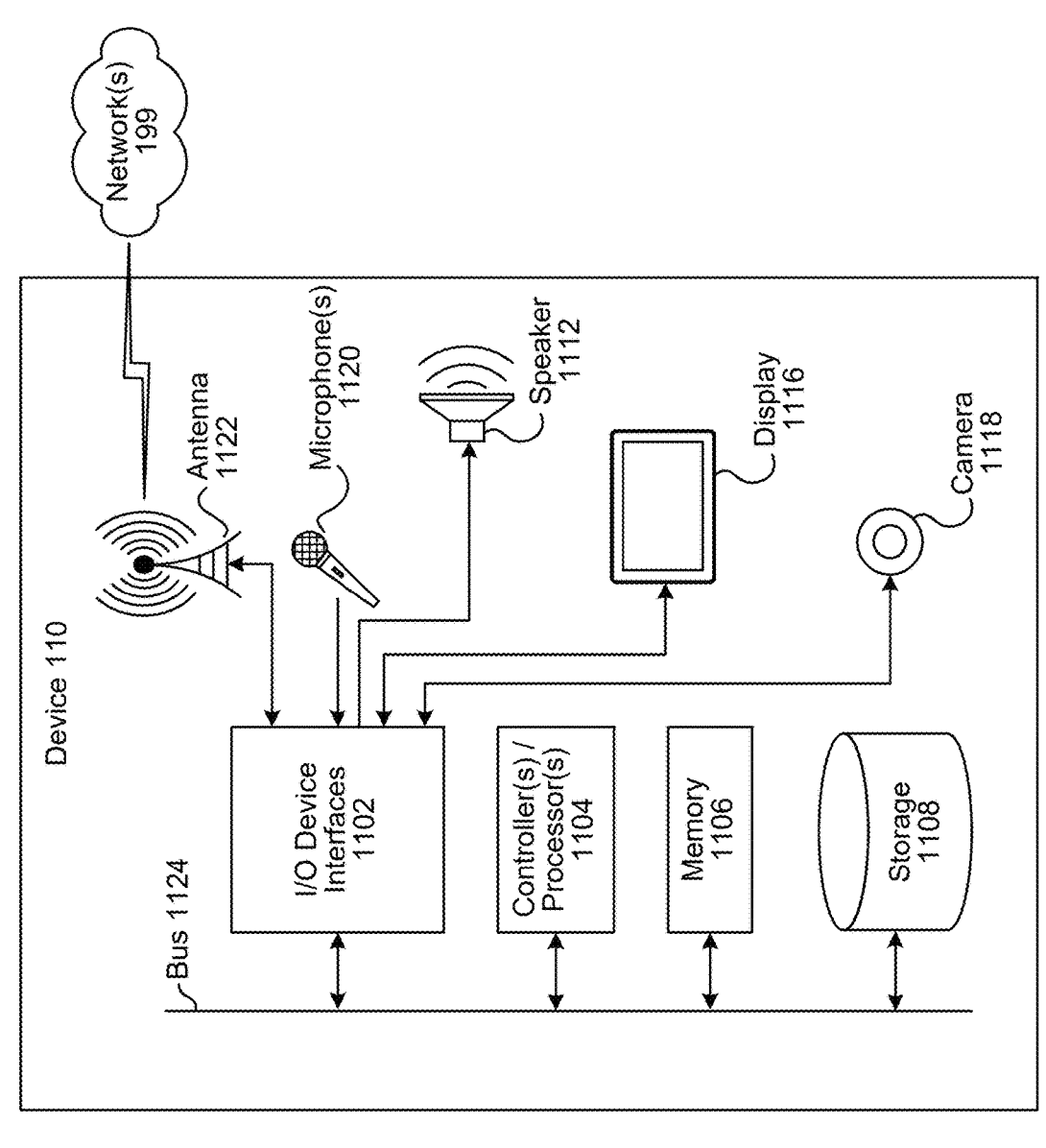
FIG. 11 is a block diagram conceptually illustrating example components of a device, according to embodiments of the present disclosure.
Figure 12:
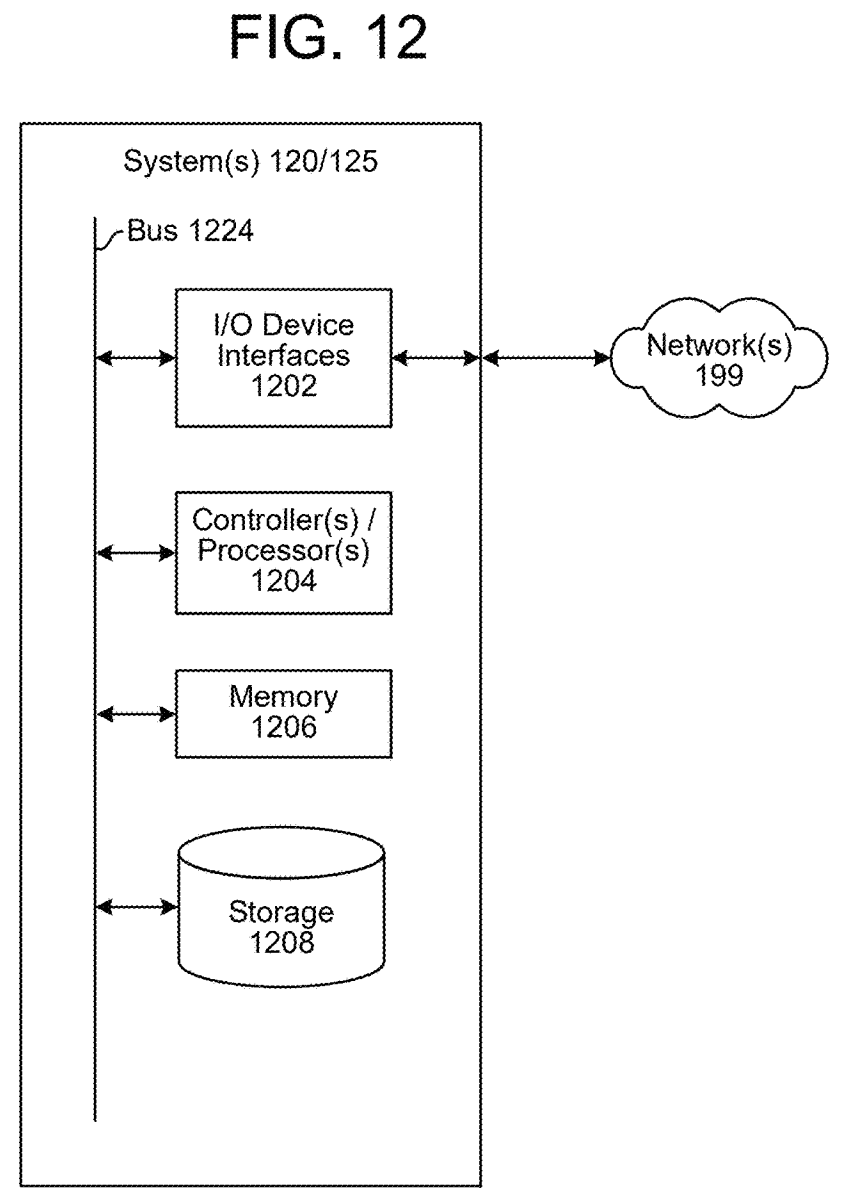

FIG. 11 is a block diagram conceptually illustrating a device 110 that may be used with the system. FIG. 12 is a block diagram conceptually illustrating example components of a remote device, such as the system 120, which may assist with ASR processing, NLU processing, etc., and a skill system 625. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) he server/system 120 may be located remotely from the device 110 as its operations may not require proximity to the user. The server/system 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/system 120 being in a user's home/business is that data used to process a command/return a response may be kept within the user's home, thus reducing potential privacy concerns.

Multiple systems (120/125) may be included in the overall system 100 of the present disclosure, such as one or more systems 120 for performing ASR processing, one or more systems 120 for performing NLU processing, one or more skill systems 625, etc. In operation, each of these systems may include computer-readable and computer-executable instructions that reside on the respective device (120/125), as will be discussed further below.

Each of these devices (110/120/125) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/125) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1102/1202).

Computer instructions for operating each device (110/120/125) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/125) includes input/output device interfaces (1102/1202). A variety of components may be connected through the input/output device interfaces (1102/1202), as will be discussed further below. Additionally, each device (110/120/125) may include an address/data bus (1124/1224) for conveying data among components of the respective device. Each component within a device (110/120/125) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1122, the input/output device interfaces 1102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device(s) 110, the system 120, or a skill system 625 may include their own dedicated processors, memory, and/or storage. Alternatively, one or more of the components of the device(s) 110, the system 120, or a skill system 625 may utilize the I/O interfaces (1102/1202), processor(s) (1104/1204), memory (1106/1206), and/or storage (1108/1208) of the device(s) 110, system 120, or the skill system 625, respectively. Thus, the ASR component 650 may have its own I/O interface(s), processor(s), memory, and/or storage; the NLU component 660 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill system 625, as described herein, are illustrative, and may be located as a stand-alone device or may be included, in whole or in part, as a component of a larger device or system. As can be appreciated, a number of components may exist either on a system 120 and/or on device 110. For example, language processing 692 (which may include ASR 650), language output 693 (which may include NLG 679 and TTS 680), etc., for example as illustrated in FIG. 6. Unless expressly noted otherwise, the system version of such components may operate similarly to the device version of such components and thus the description of one version (e.g., the system version or the local version) applies to the description of the other version (e.g., the local version or system version) and vice-versa.

Figure 13:
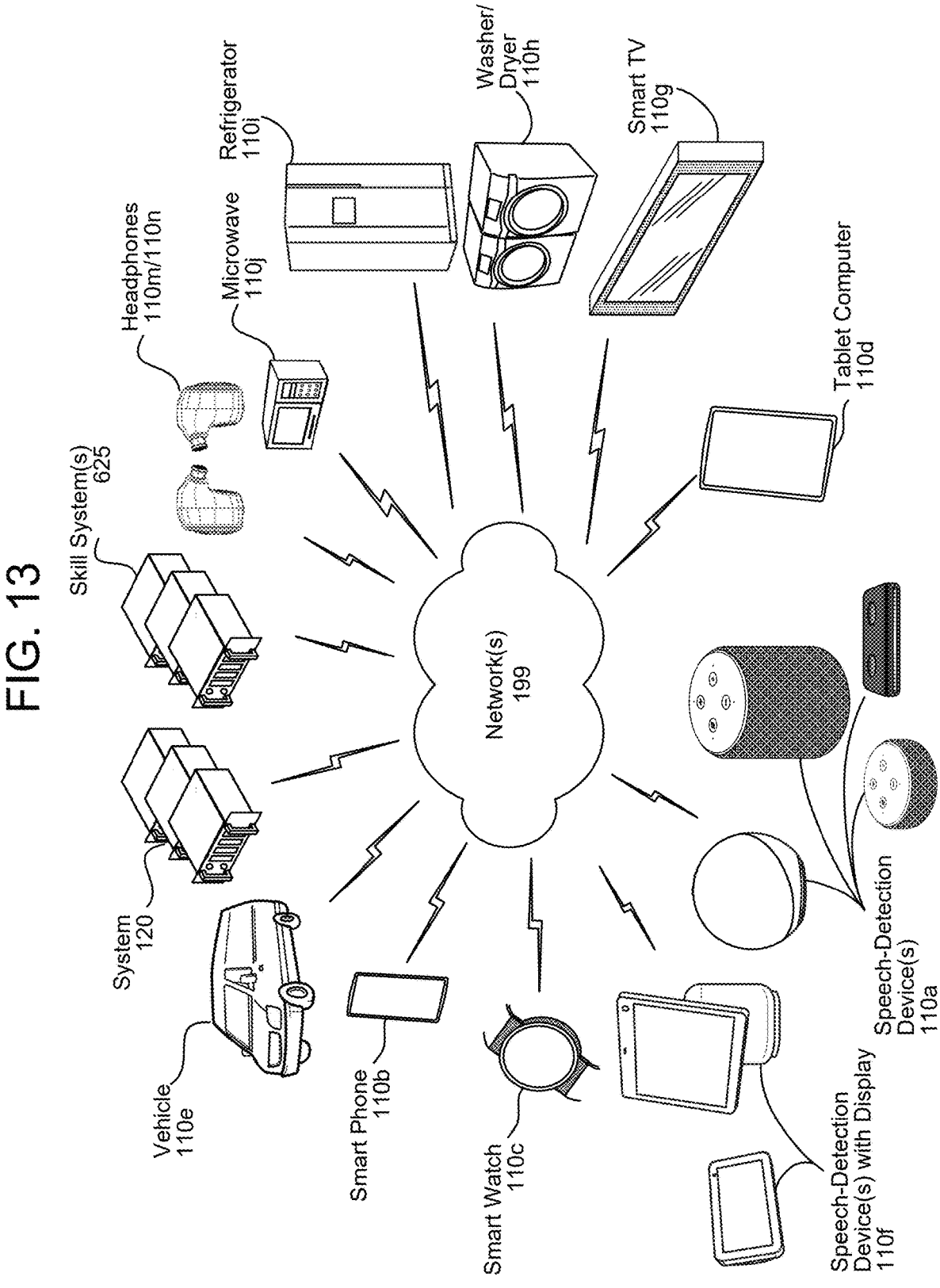
FIG. 13 illustrates an example of a computer network for use with the overall system, according to embodiments of the present disclosure.

As illustrated in FIG. 13, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the system 120, the skill system(s) 625, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 650, the NLU component 660, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
operating, by a first device, a first neural network model stored on the first device to determine output data, the first neural network model including a first plurality of layers;
determining at least a first updatable layer of the first plurality of layers to update based on training of the first neural network model;
determining one or more layers of the first neural network model, different from the first updatable layer, to be kept constant during training of the first neural network model;
training, by the first device, the first neural network model using the output data to determine first updated parameters for the first updatable layer, wherein parameters of the one or more layers are kept constant during the training;
sending, a second device, first model update data representing the first updated parameters;
receiving, from the second device in response to the first model update data, second model update data;
determining, using the second model update data, second updated parameters for a second updatable layer, the second updatable layer replacing the first updatable layer in the first neural network model to generate a second neural network model; and operating, by the first device, the second neural network model using the second updatable layer in place of the first updatable layer.

2. The computer-implemented method of claim 1, further comprising:

operating, by the second device, a second neural network model, wherein the second neural network model includes a second plurality of layers and is configured to process a same type of data as the first neural network model;

receiving, by the second device, the first model update data;

receiving, by the second device, at least third model update data from at least a third device;

determining, using the first model update data and the third model update data, second updated parameters for one or more internal layers of the second plurality of layers;

determining, using the second updated parameters, the second model update data; and sending the second model update data to the first device.

3. A computer-implemented method comprising:

operating, by a first device, a first machine learning model stored on the first device to determine first output data;

determining first one or more layers of the first machine learning model to update based on training of the first machine learning model;

determining second one or more layers of the first machine learning model, different from the first one or more layers, to be kept constant during training of the first machine learning model;

training, by the first device, the first machine learning model using the first output data to determine first updated parameters for the first one or more layers, wherein parameters of the second one or more layers are kept constant during the training; and sending, to a second device, first model update data representing the first updated parameters, the second device updating a second machine learning model based on the first model update data.

4. The computer-implemented method of claim 3, further comprising:

receiving, from the second device in response to the first model update data, second model update data;

determining, using the second model update data, second updated parameters for third one or more layers, the third one or more layers replacing the first one or more layers in the first machine learning model to generate a second machine learning model; and operating, by the first device, the second machine learning model.

5. The computer-implemented method of claim 3, further comprising:

adding the first one or more layers between existing layers of a pre-trained machine learning model to generate the first machine learning model.

6. The computer-implemented method of claim 3, wherein:

determining the first one or more layers includes determining one or more existing layers of the first machine learning model to be the first one or more layers.

7. The computer-implemented method of claim 3, further comprising:

operating, by the second device, a second machine learning model, wherein the second machine learning model is configured to process a same type of data as the first machine learning model;

receiving, by the second device, the first model update data;

determining, using the first model update data, third updated parameters for one or more layers of the second machine learning model;

determining, using the third updated parameters, second model update data; and sending the second model update data to the first device.

8. The computer-implemented method of claim 3, further comprising:

operating, by the second device, a second machine learning model, wherein the second machine learning model is configured to process a same type of data as the first machine learning model;

receiving, by the second device, the first model update data;

receiving, by the second device, at least third model update data from at least a third device;

determining, using the first model update data and the third model update data, second model update data; and sending the second model update data to the first device.

9. The computer-implemented method of claim 3, further comprising:

receiving, from the second device in response to the first model update data, second model update data;

determining, using the second model update data, a second machine learning model representing a version of the first machine learning model updated based on the second model update data;

determining a dataset for validating the second model update data;

processing the dataset using the first machine learning model to determine second output data;

processing the dataset using the second machine learning model to determine third output data; and determining, based at least in part on the first output data and the second output data, to process subsequent input data using the second machine learning model.

10. The computer-implemented method of claim 3, further comprising:

receiving, from the second device in response to the first model update data, second model update data;

determining, using the second model update data, a second machine learning model representing a version of the first machine learning model updated based on the second model update data;

determining a dataset for validating the second model update data;

processing the dataset using the first machine learning model to determine second output data;

processing the dataset using the second machine learning model to determine third output data;

determining, based at least in part on the second output data and the third output data, to perform a partial update of the first machine learning model; and in response to determining to perform a partial update, determining, using the second model update data, a second machine learning model representing a partial update of the first machine learning model.

11. The computer-implemented method of claim 3, wherein:

generating the first model update data includes performing at least one mathematical function described by a protocol on the first updated parameters; and performing the at least one mathematical function includes modifying one or more of a number of parameters or a value of one or more parameters of the first updated parameters.

12. A system, comprising:

at least one processor; and at least one memory comprising instructions that, when executed by the at least one processor, cause the system to:

operate, by a first device, a first machine learning model stored on the first device to determine first output data;

determine first one or more layers of the first machine learning model to update based on training of the first machine learning model;

determine second one or more layers of the first machine learning model, different from the first one or more layers, to be kept constant during training of the first machine learning model;

train, by the first device, the first machine learning model using the first output data to determine first updated parameters for the first one or more layers, wherein parameters of the second one or more layers are kept constant during the training; and send, to a second device, first model update data representing the first updated parameters, the second device updating a second machine learning model based on the first model update data.

13. The system of claim 12, wherein the at least one memory further comprises instructions that, when executed by the at least one processor, further cause the system to:

receive, from the second device in response to the first model update data, second model update data;

determine, using the second model update data, second updated parameters for third one or more layers, the third one or more layers replacing the first one or more layers in the first machine learning model to generate a second machine learning model; and operate, by the first device, the second machine learning model.

14. The system of claim 12, wherein the at least one memory further comprises instructions that, when executed by the at least one processor, further cause the system to:

add the first one or more layers between existing layers of a pre-trained machine learning model to generate the first machine learning model.

15. The system of claim 12, wherein determining the first one or more layers includes determining one or more existing layers of the first machine learning model to be the first one or more layers.

16. The system of claim 12, wherein the at least one memory further comprises instructions that, when executed by the at least one processor, further cause the system to:

operate, by the second device, a second machine learning model, wherein the second machine learning model is configured to process a same type of data as the first machine learning model;

receive, by the second device, the first model update data;

determine, using the first model update data, third updated parameters for one or more layers of the second machine learning model;

determine, using the third updated parameters, second model update data; and send the second model update data to the first device.

17. The system of claim 12, wherein the at least one memory further comprises instructions that, when executed by the at least one processor, further cause the system to:

operate, by the second device, a second machine learning model, wherein the second machine learning model is configured to process a same type of data as the first machine learning model;

receive, by the second device, the first model update data;

receive, by the second device, at least third model update data from at least a third device;

determine, using the first model update data and the third model update data, second model update data; and send the second model update data to the first device.

18. The system of claim 12, wherein the at least one memory further comprises instructions that, when executed by the at least one processor, further cause the system to:

receive, from the second device in response to the first model update data, second model update data;

determine, using the second model update data, a second machine learning model representing a version of the first machine learning model updated based on the second model update data;

determine a dataset for validating the second model update data;

process the dataset using the first machine learning model to determine second output data;

process the dataset using the second machine learning model to determine third output data; and determine, based at least in part on the first output data and the second output data, to process subsequent input data using the second machine learning model.

19. The system of claim 12, wherein the at least one memory further comprises instructions that, when executed by the at least one processor, further cause the system to:

receive, from the second device in response to the first model update data, second model update data;

determine, using the second model update data, a second machine learning model representing a version of the first machine learning model updated based on the second model update data;

determine a dataset for validating the second model update data;

process the dataset using the first machine learning model to determine second output data;

process the dataset using the second machine learning model to determine third output data;

determine, based at least in part on the second output data and the third output data, to perform a partial update of the first machine learning model; and in response to determining to perform a partial update, determine, using the second model update data, a second machine learning model representing a partial update of the first machine learning model.

20. The system of claim 12, wherein the at least one memory further comprises instructions that, when executed by the at least one processor, further cause the system to:

generate the first model update data by performing at least one mathematical function described by a protocol on the first updated parameters, wherein the at least one mathematical function includes modifying one or more of a number of parameters or a value of one or more parameters of the first updated parameters.

21. The computer-implemented method of claim 3, further comprising:

determining loss data corresponding to determining the first output data, the first output data determined using first parameters of the first one or more layers;

performing a backpropagation algorithm using the loss data and the first parameters to determine gradient data corresponding to the first one or more layers; and performing a gradient descent algorithm using the gradient data and the first parameters to determine the first updated parameters.

22. The system of claim 12, wherein the at least one memory further comprises instructions that, when executed by the at least one processor, further cause the system to:

determine loss data corresponding to determining the first output data, the first output data determined using first parameters of the first one or more layers;

perform a backpropagation algorithm using the loss data and the first parameters to determine gradient data corresponding to the first one or more layers; and perform a gradient descent algorithm using the gradient data and the first parameters to determine the first updated parameters.

\* \* \* \* \*